US012261987B2

United States Patent
Chika et al.

(10) Patent No.: US 12,261,987 B2
(45) Date of Patent: Mar. 25, 2025

(54) IMAGE FORMING APPARATUS, NON-TRANSITORY COMPUTER READABLE MEDIUM, AND IMAGE FORMING METHOD

(71) Applicant: FUJIFILM Business Innovation Corp., Tokyo (JP)

(72) Inventors: Yusuke Chika, Kanagawa (JP); Takumi Nishikata, Kanagawa (JP); Kazunobu Uchiyama, Kanagawa (JP); Eiichi Waida, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 353 days.

(21) Appl. No.: 17/711,435

(22) Filed: Apr. 1, 2022

(65) Prior Publication Data

US 2023/0100727 A1 Mar. 30, 2023

(30) Foreign Application Priority Data

Sep. 28, 2021 (JP) .................................. 2021-157536

(51) Int. Cl.
- *H04N 1/08* (2006.01)
- *H04N 1/387* (2006.01)
- *H04N 1/60* (2006.01)

(52) U.S. Cl.
CPC ......... *H04N 1/3876* (2013.01); *H04N 1/6008* (2013.01); *H04N 1/6063* (2013.01)

(58) Field of Classification Search
CPC ... H04N 1/3876; H04N 1/6008; H04N 1/6063
See application file for complete search history.

(56) References Cited

U.S. PATENT DOCUMENTS

2014/0285499 A1* 9/2014 Iwasaki .................. G09G 5/363
                                                            345/502
2019/0320094 A1* 10/2019 Jackson ................. H04N 1/603

FOREIGN PATENT DOCUMENTS

JP    2011-183804 A    9/2011
JP    2020-170038 A    10/2020

* cited by examiner

*Primary Examiner* — Ibrahim Siddo
(74) *Attorney, Agent, or Firm* — Oliff PLC

(57) ABSTRACT

An image forming apparatus includes first and second processors controlling first and second image formers that form first and second images using color material having first and second color compositions, the second image to be superimposed on the first image; and a display displaying information. If an image formation instruction, including information indicating that the first and second images are to be superimposed is received, with a different image formation instruction being received, the first processor causes the first image former to form the first image in accordance with a first image formation instruction, corresponding to the first color composition, out of the image formation instruction and the different image formation instruction; and transmit to the second processor a second image formation instruction corresponding to the second color composition. The second processor causes the second image former to form the second image in accordance with the second image formation instruction.

18 Claims, 20 Drawing Sheets

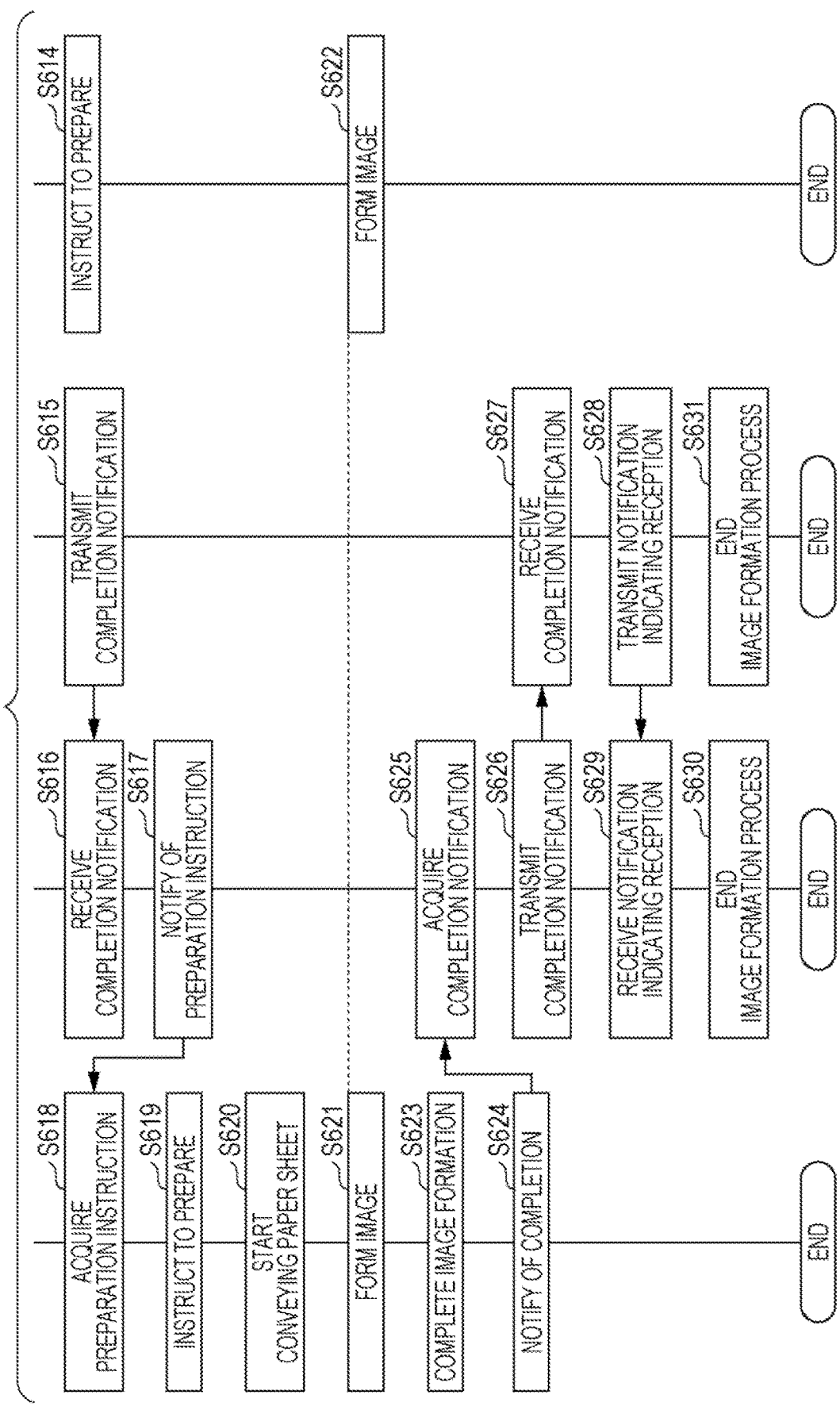

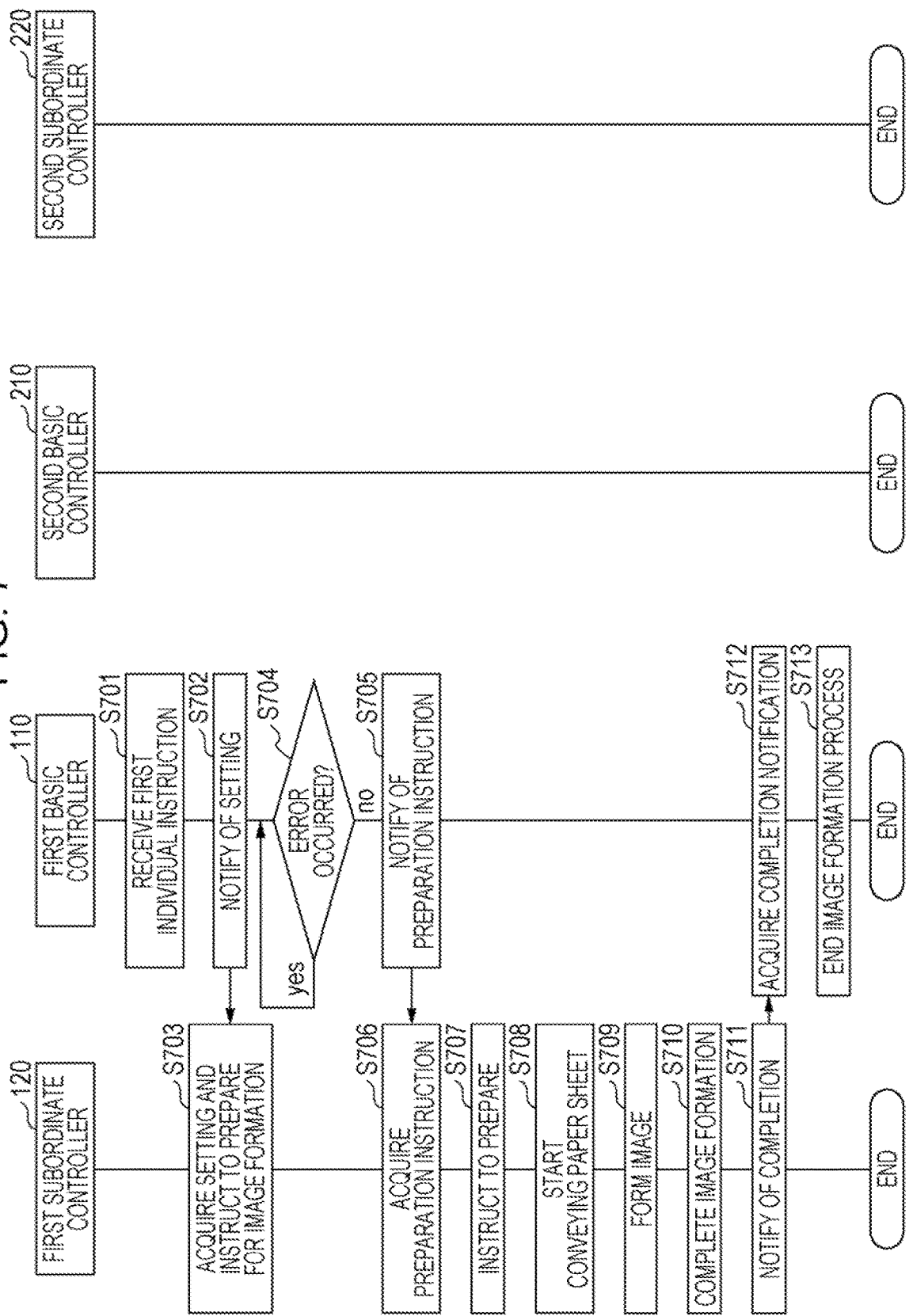

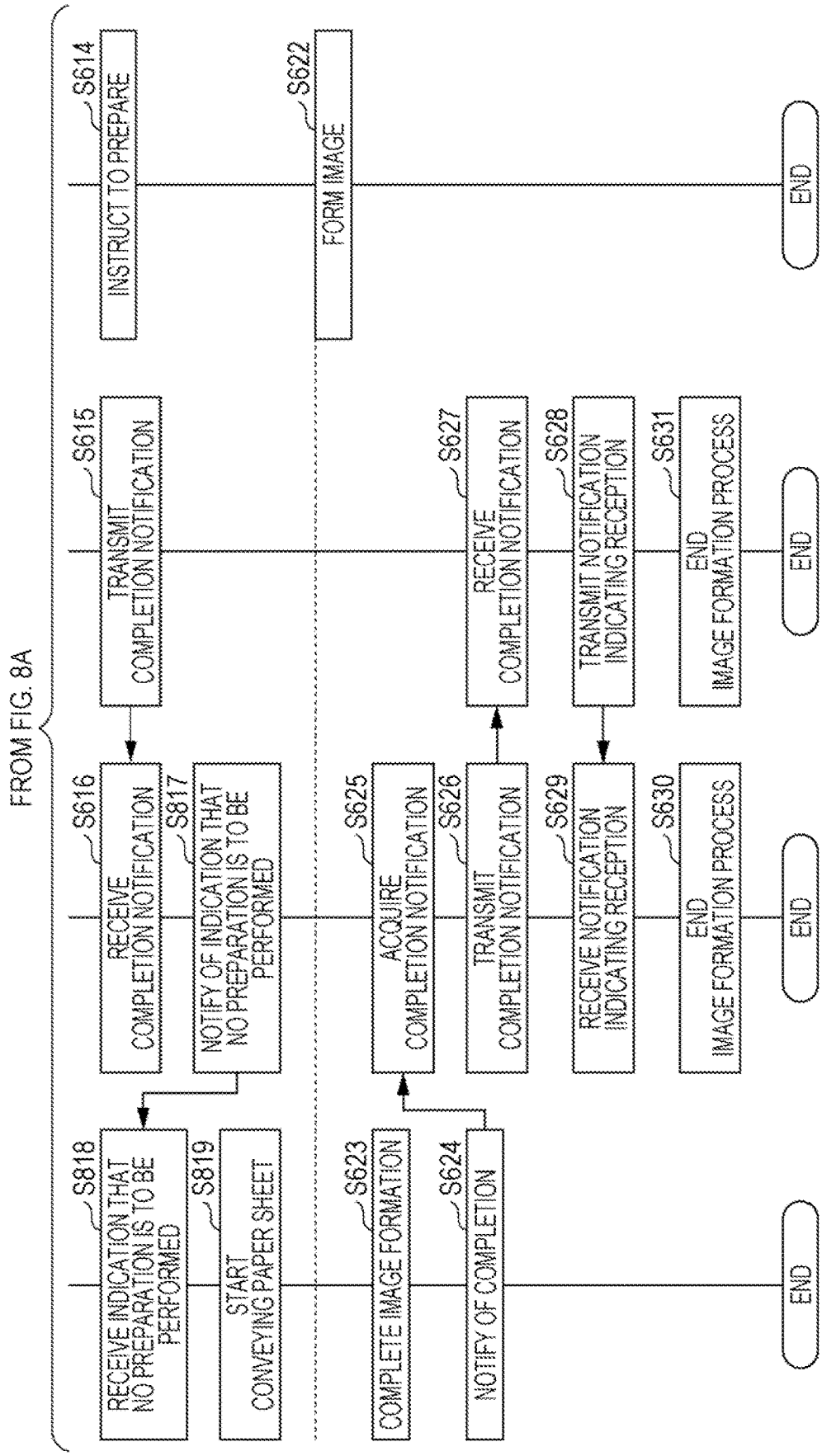

IMAGE FORMING APPARATUS, NON-TRANSITORY COMPUTER READABLE MEDIUM, AND IMAGE FORMING METHOD

CROSS-REFERENCE TO RELATED APPLICATIONS

This application is based on and claims priority under 35 use 119 from Japanese Patent Application No. 2021-157536 filed Sep. 28, 2021.

BACKGROUND

(i) Technical Field

The present disclosure relates to an image forming apparatus, non-transitory computer readable medium, and image forming method.

(ii) Related Art

Techniques of forming an image on a single paper sheet with two image formers are disclosed. For example, Japanese Unexamined Patent Application Publication No. 2020-170038 discloses an image forming apparatus that includes in a single housing a first image former forming a first image, second image former forming a second image, first controller controlling the first image former and second controller controlling the second image former. The image forming apparatus superimposes the first image and second image onto the single paper sheet.

The image forming apparatus disclosed in Japanese Unexamined Patent Application Publication No. 2020-170038 superimposes the second image on the first image onto a single paper sheet. The first and second controllers may recognize image formation instructions respectively corresponding to the two images to be superimposed. For example, a document or the like created by an application is divided and separated, forming the first image and second image and then the first image and second image are superimposed to each other. The image forming apparatus may recognize image formation instructions, respectively corresponding to the images to be superimposed, by referring to identification information related to the image formation instructions from the single application. However, if an image formation instruction used to form the first image and an image formation instruction used to form the second image are created by different applications, the image forming apparatus may have a difficulty in identifying the image formation instructions about the two images to be superimposed, using the information on the image formation instruction.

SUMMARY

Aspects of non-limiting embodiments of the present disclosure relate to providing an image forming apparatus that, superimpose two images even when image formation instructions instructing two images to be superimposed onto a single paper sheet do not include information on the two images.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including: a first processor configured to control a first image former that forms a first image using a color material having a first color composition; a second processor configured to control a second image former that forms, using a color material having a second color composition, a second image to be superimposed on the first image; and a display displaying information. The first processor is configured to: if an image formation instruction, including information indicating that the first image and the second image are to be superimposed to each other is received, with a different image formation instruction being received, the different image formation instruction having identification information identical to identification information for the image formation instruction, cause the first image former to form the first image in accordance with a first image formation instruction, corresponding to the first color composition, out of the image formation instruction and the different image formation instruction; and transmit to the second processor a second image formation instruction corresponding to the second color composition; and the second processor is configured to cause the second image former to form the second image in accordance with the second image formation instruction. The first processor is configured to: if the image formation instruction, including the information indicating that the first image and the second image are to be superimposed to each other, is received, with the different image formation instruction having the identical identification information not being received, cause the display to display information related to the image formation instruction in order to prompt selection between the first image and the second image.

BRIEF DESCRIPTION OF THE DRAWINGS

Exemplary embodiment of the present disclosure will be described in detail based on the following figures, wherein;

FIGS. 6A and 6B illustrate an example of a process performed by the first and second controllers;

FIG. 7 illustrates an example of a process performed by the first controller when a first basic controller receives a first individual instruction;

FIGS. 8A and 8B illustrate an example of a process performed by the first and second controllers when the first basic controller receives a second individual instruction;

DETAILED DESCRIPTION

Figure 1:
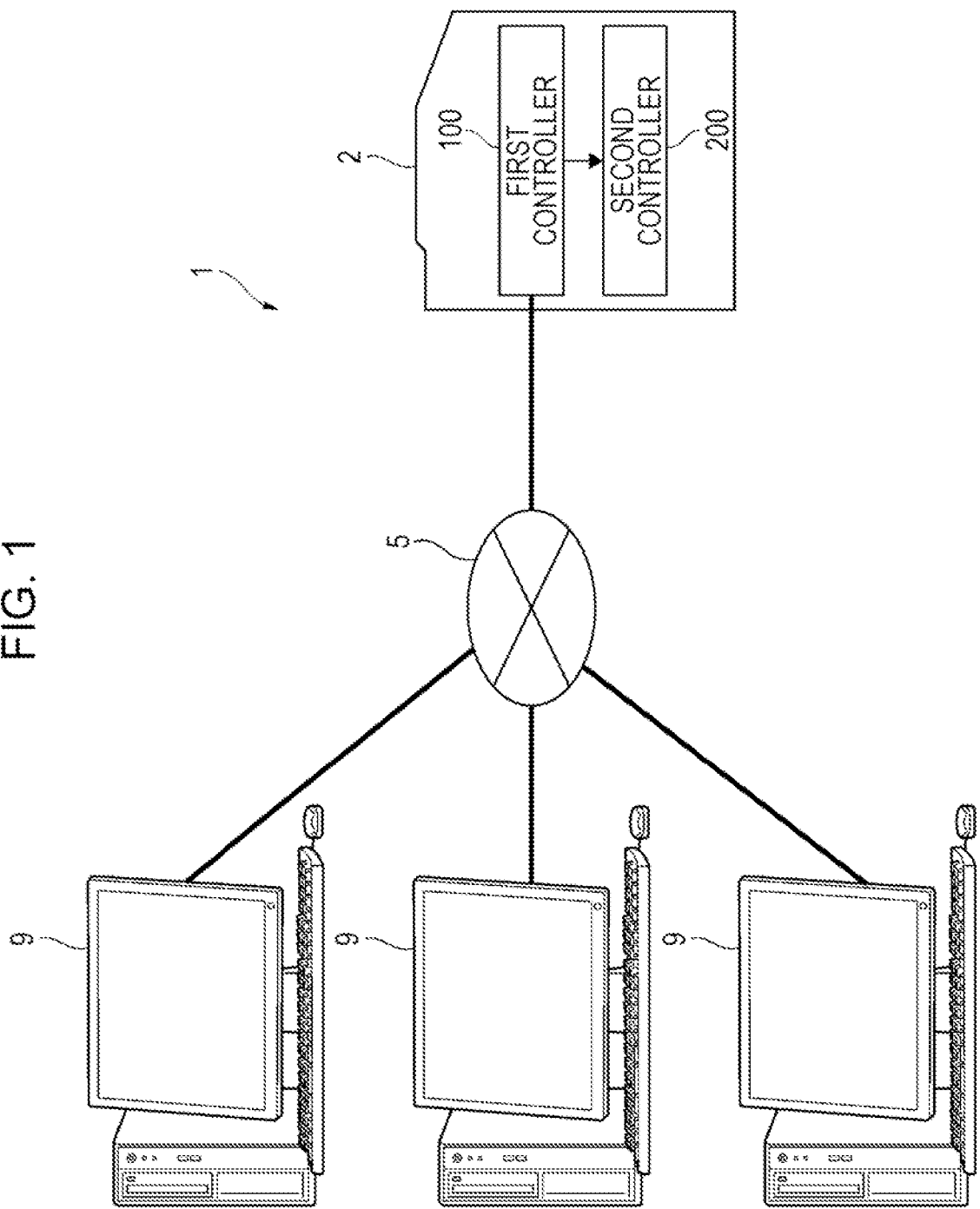
FIG. 1 illustrates an example of a configuration of an image forming system of an exemplary embodiment.
Figure 2:
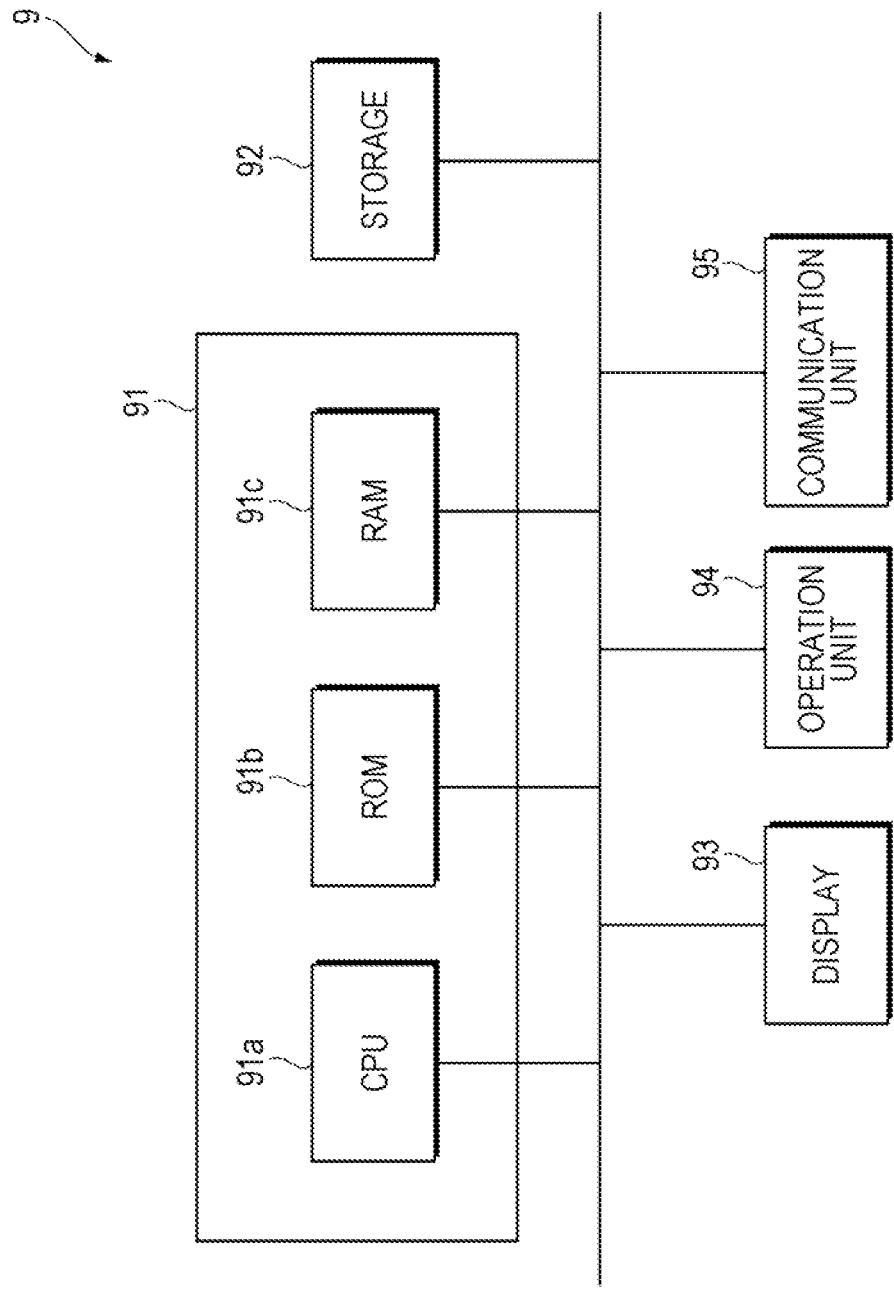
FIG. 2 illustrates an example of a hardware configuration of a terminal apparatus.
Figure 3:
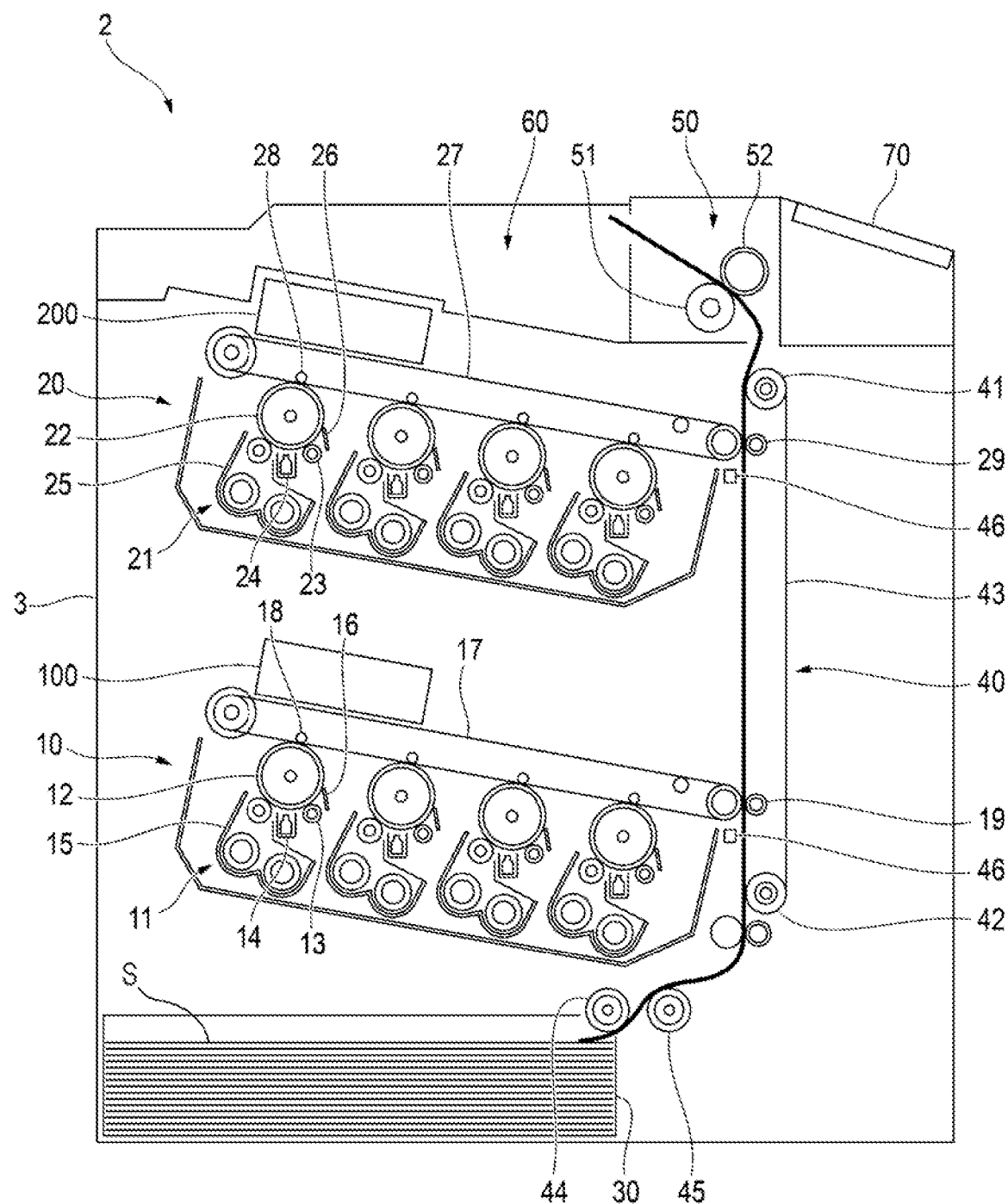
FIG. 3 illustrates an example of an internal structure of an image forming apparatus.
Figure 4:
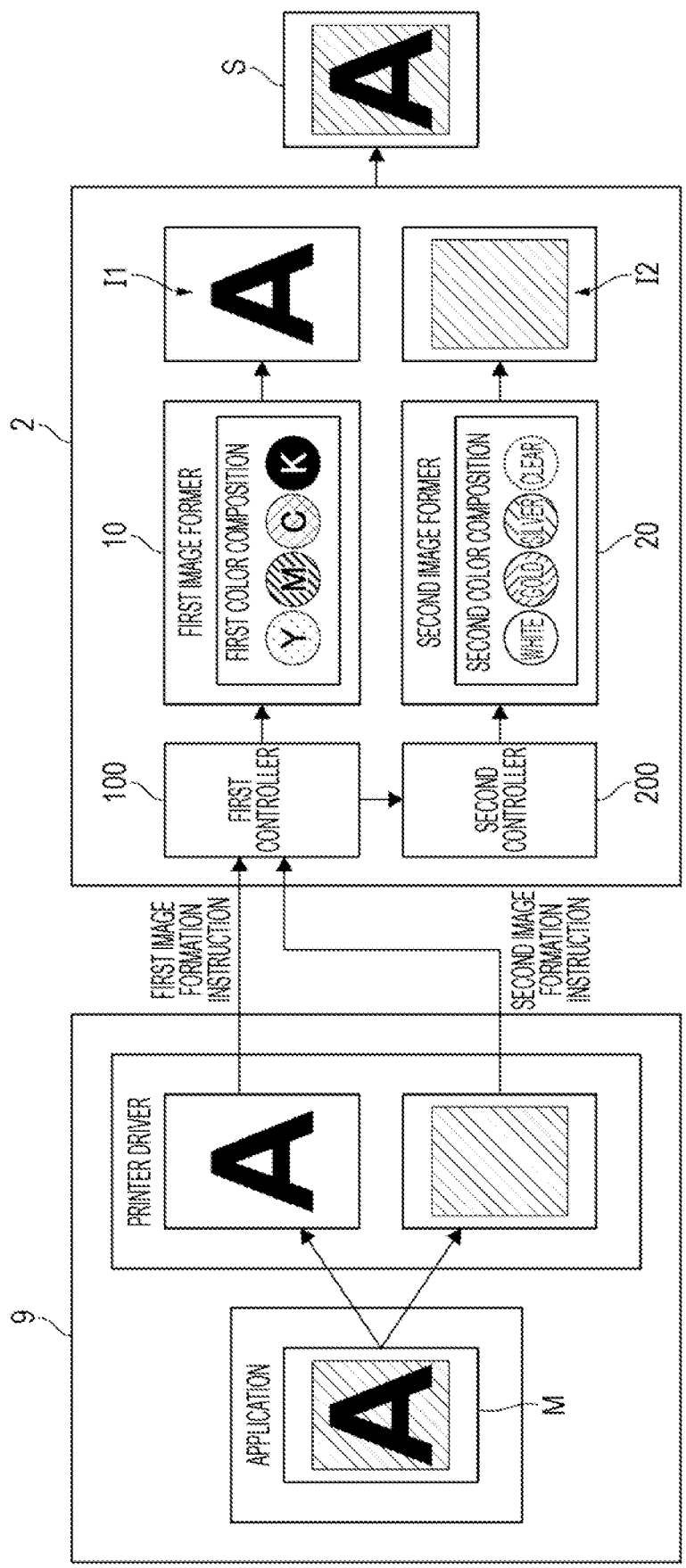
FIG. 4 illustrates an example of a functional configuration of the terminal apparatus and image forming apparatus.

Exemplary embodiment of the disclosure is described with reference to the attached drawings. FIG. 1 illustrates an example of a configuration of an image forming system 1 in accordance with the exemplary embodiment. FIG. 2 illustrates an example of a hardware configuration of a terminal apparatus 9. FIG. 3 illustrates an example of an internal structure of an image forming apparatus 2. FIG. 4 illustrates an example of a functional configuration of the terminal apparatus 9 and image forming apparatus 2. The image forming system 1 includes the image forming apparatus 2 and the terminal apparatuses 9 connected to the image forming apparatus 2 via a communication network 5. The communication network 5 is not limited to any type of network used for data communication between apparatuses. For example, the communication network 5 may include a wide-area network (WAN) and/or a local-area network (LAN). The communication network S may be a wired network, a wireless network, or a combination thereof. For example, wireless LAN may be WiFi (registered trademark).

The image forming apparatus 2 includes, in a single housing 3, two image formers forming images onto a single paper sheet S, namely, a first image former 10 and second image former 20, first controller 100 controlling the first image former 10, and second controller 200 controlling the second image former 20. In the image forming apparatus 2, the first controller 100 controls a paper conveyance device 40 that conveys the paper sheet S. The image forming apparatus 2 will be described below in greater detail.

Terminal Apparatus

The terminal apparatus 9 includes a controller 91 controlling the whole terminal apparatus 9, storage 92 used to store data, display 93 used to display an operation reception screen and an image, operation unit 94 used to receive an input operation from a user, and communication unit 95 used to communicate with the outside.

The controller 91 includes a central processing unit (CPU) 91a, read-only memory (ROM) 91b, and random-access memory (RAM) 91c. The ROM 91b stores a basic program (operating system) executed by the CPU 91a and a variety of settings. The CPU 91a utilizes the RAM 91c as a working area and executes an application program read from the ROM 91b or storage 92. Each element of the terminal apparatus 9 is controlled by the CPU 91a that executes the programs.

The storage 92 may be, for example, a semiconductor memory. The storage 92 stores application programs including a word-processing application and a printer driver. The storage 92 also stores compositions of colors utilized by the first image former 10 and second image former 20 in the image forming apparatus 2.

The word-processing application generates an instruction to form in a paper sheet S an image of an original document M that has been created using the word-processing application. The printer driver acquires the instruction to generate an image output from the application and converts the instruction into a command that, may be analyzed by the image forming apparatus 2.

Specifically, after acquiring the image formation instruction of the original document M output from the application, the printer driver converts the image formation instruction into a first, image formation instruction and second image formation instruction in view of characteristics of the first image former 10 and the second image former 20. The first image formation instruction serves as a command to form an image on the first image former 10 and the second image formation instruction serves as a command to form an image on the second image former 20. The printer driver then outputs the first image formation instruction and second image formation instruction to the first controller 100. The first image formation instruction and the second image formation instruction, if not differentiated from each other, are sometimes collectively referred to as an "image formation instruction."

The image formation instruction includes identification information identifying the image formation instruction, image data serving as data of an image to be formed, and a setting of image formation specified. The setting of the image formation indicates the size and material of the paper sheet S on which an image is to be formed, and a designate of color of a color material to be utilized. The image formation instruction includes information indicating whether the image formation instruction is a cooperation instruction or an individual instruction. For example, the identification information may include information on the terminal apparatus 9 from which the identification information has been output, and time when the image formation instruction is output.

The display 93 displays a still image or a video. For example, the display 93 is a liquid-crystal display or an organic electroluminescent (EL) display.

The operation unit 94 is an input device that receives an operation from the user. For example, the operation unit 94 includes buttons, switches, and a touch panel. The communication unit 95 is, for example, a communication interface.

The terminal apparatus 9 thus constructed may be a notebook personal computer (PC), desktop PC, tablet PC, tablet terminal, multi-function cell phone (such as smart phone), cell phone (such as feature phone), or personal digital assistant (PDA).

Image Forming Apparatus

The image forming apparatus 2 includes the first image former 10 that forms an image on the paper sheet S serving as an example of a recording medium and the second image former 20 that forms an image on the paper sheet S. The image forming apparatus 2 further includes a paper sheet tray 30 that holds the paper sheet S, and paper conveyance device 40 that conveys the paper sheet S from the paper sheet tray 30 to the first image former 10. The image forming apparatus 2 further includes a fixing device 50, paper sheet discharge tray 60, and user interface (UI) 70. The fixing device 50 heats and presses a toner image on the paper sheet S to fix the toner image on the paper sheet S. The paper sheet discharge tray 60 receives and stacks the paper sheets S having images formed by the fixing device 50 that have fixed the toner images on the paper sheets S. The UI 70 displays information. The image forming apparatus 2 further includes the first controller 100 that controls the first image former 10, paper conveyance device 40, and fixing device 50, and the second controller 200 that controls the second image former 20.

The first image former 10 includes four image forming units 11 that are arranged side by side with regular intervals therebetween and form respective toner images of toner colors serving as color materials. Each image forming unit 11 includes a photoconductor drum 12 holding a toner image, charging device 13 that charges the surface of the photoconductor drum 12, and light-emitting diode (LED) print head 14 that forms an electrostatic latent image on the photoconductor drum 12 by exposing the photoconductor drum 12 charged by the charger 13 in accordance with image data of each color. Each image forming unit 11 includes a development device 15 that develops the electrostatic latent image on the photoconductor drum 12 with toner and drum cleaner 16 that cleans the photoconductor drum 12 after transferring. The development devices 15 in the four image forming units 11 of the exemplary embodiment respectively hold yellow (Y) toner, magenta (M) toner, cyan (C) toner, and black (K) toner and thus form respective color toner images. The composition of the toner colors (for example, yellow (Y), magenta (M), cyan (C), and black (K)) held by the four image forming units 11 in the first image former 10 may be referred to as a "first color composition."

The first image former 10 also includes an intermediate transfer belt 17 to which toner images formed by the photoconductor drums 12 in the image forming units 11 are transferred. The first image former 10 also includes first transfer rollers 18 and second transfer roller 19. The first transfer rollers 18 successively first-transfer to the intermediate transfer belt 17 the color toner images formed on the image forming units 11 (a first transfer operation). The second transfer roller 19 second-transfer the color toner images in batch, superimposed and transferred on the intermediate transfer belt 17, to the paper sheet S (a second transfer operation).

Like the first image former 10, the second image former 20 includes four image forming units 21, intermediate transfer belt 27, first transfer rollers 28, and second transfer roller 29. Like the image forming unit 11, each image forming unit 21 includes a photoconductor drum 22, charging device 23, LED print head 24, development device 25, and dry cleaner 26. The development devices 25 in the four image forming units 21 of the exemplary embodiment respectively hold white-colored, gold-colored, silver-colored and clear-colored toners and forms white-colored, gold-colored, silver-colored and clear-colored toner images. The colors of toner held by the development devices 25 in the image forming units 21 are not limited to the colors described above. The toner colors may be red, blue, and green. The composition of the toner colors (for example, white color, gold color, silver color, and clear color) held by the four image forming units 21 in the second image former 20 may be also referred to as a "second color composition."

The paper conveyance device 40 includes an upper roller 41 and lower roller 42 vertically spaced apart from each other and a conveyor belt 43 that is entrained about the upper roller 41 and lower roller 42. The paper conveyance device 40 further includes a feed roller 44 that feeds the paper sheet S at the paper sheet tray 30 toward the conveyor belt 43 and a conveyor roller 45 that is arranged between the feed roller 44 and conveyor belt 43. The paper conveyance device 40 also includes multiple sensors 46 that detect the passage of the paper sheet S conveyed.

The fixing device 50 includes a heat roller 51 that heats the incoming paper sheet S and belt module 52 that is pressed against the heat roller 51 and forms a pressure section with the heat roller 51. The fixing device 50 fixes the toner image onto the paper sheet S by pressing and heating the pressure section on the paper sheet S bearing the toner image.

The UI 70 is a touch panel that is a combination of a display, such as a liquid-crystal display or organic EL display, and a position input device, such as a touch pad. The UI 70 receives information from the user while also displaying information to the user.

The image forming apparatus 2 thus constructed operates as described below. Four color toner images formed on the photoconductor drums 12 in the image forming units 11 in the first image former 10 are first-transferred to the intermediate transfer belt 17 via the first transfer rollers 18 and a superimposed toner image in which four color toner images are superimposed is thus formed. As the intermediate transfer belt 17 moves, the superimposed toner image on the intermediate transfer belt 17 is conveyed to a second transfer section where the second transfer roller 19 is arranged.

The paper sheet S is fed to the second transfer section from the paper sheet tray 30 in synchronization with when the superimposed toner image in the first image former 10 is conveyed to the second transfer section. Electric field created by the second transfer roller 19 second-transfers the superimposed toner image in batch to the incoming paper sheet S in the second transfer section. The superimposed toner image formed by the first image former 10 is hereinafter referred to as a "first image I1."

Other four color toner images formed on the photoconductor drums 22 in the image forming units 21 in the second image former 20 are first-transferred to the intermediate transfer belt 27 by the first transfer rollers 28 and a superimposed toner image on which the other four color toner images are superimposed is formed on the intermediate transfer belt 27. As the intermediate transfer belt 27 moves, the superimposed toner image on the intermediate transfer belt 27 is conveyed to a second transfer section where the second transfer roller 29 is arranged.

The paper sheet S, having the superimposed toner image that has been electrostatic-transferred in the first image former 10, is fed to the second transfer section in synchronization with when the superimposed toner image in the second image former 20 is conveyed to the second transfer section. In the second transfer section, electric field created by the second transfer roller 29 second-transfers the superimposed toner images in batch on the incoming paper sheet S having the superimposed toner image that has been electrostatically transferred in the first image former 10. The superimposed toner image formed by the second image former 20 is hereinafter also referred to as a "second image I2."

A superimposed toner image on which the superimposed toner image in the first image former 10 and the superimposed toner image in the second image former 20 are superimposed is electrostatically transferred to the paper sheet S. The resulting paper sheet S is conveyed to the fixing device 50. The toner image on the paper sheet S conveyed to the fixing device 50 is heated and pressed by the fixing device 50 and is thus fixed onto the paper sheet S. The paper sheet S bearing the fixed image is conveyed to the paper sheet discharge tray 60 in the image forming apparatus 2.

Figure 5:
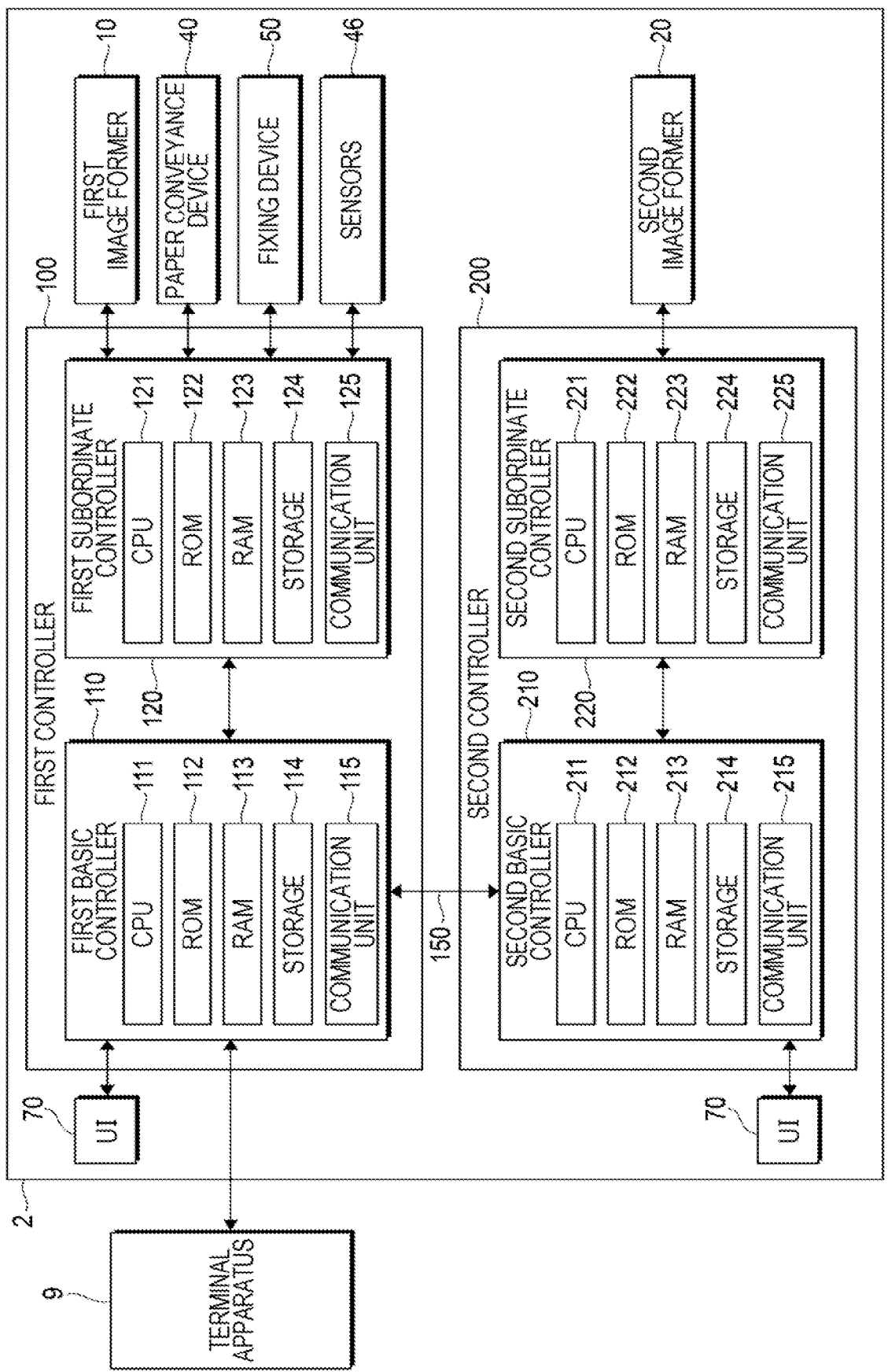
FIG. 5 is a block diagram illustrating an example of a hardware configuration of a first controller and second controller.

FIG. 5 illustrates an example of a hardware configuration of the first controller 100 and the second controller 200.

First Controller 100

The first controller 100 includes a first basic controller 110 chat controls operations of the first image former 10, paper conveyance device 40, fixing device 50, and the like, and first subordinate controller 120 that controls, under the control of the first basic controller 110, the operations of the first image former 10, paper conveyance device 40, fixing device 50, and the like.

The first basic controller 110 includes a central processing unit (CPU) 111, read-only memory (ROM) 112, random-access memory (RAM) 113, storage 114, such as a semiconductor memory, and communication unit 115 used to communicate with the outside. The communication unit 115 is a communication interface.

The ROM 112 stores a basic program (operating system) executed by the CPU 111, and a variety of settings. The CPU 111 executes programs read from the ROM 112 or the storage 114 using the RAH 113 as a working area. The functions of the first basic controller 110 are performed as described below when the CPU 111 executes the program.

The first basic controller 110 transmits or receives information to or from the first subordinate controller 120, second controller 200 and UI 70 via the communication unit 115.

The first basic controller 110 also receives, via the communication unit 115, an image formation instruction from the outside, such as the terminal apparatus 9. The first basic controller 110 analyzes the received image formation instruction. The image formation instruction includes identification information, image data, setting of image formation, and information indicating whether the image formation instruction is a cooperation instruction or an individual instruction described below.

The first basic controller 110 performs a predetermined image processing operation on the received image data. The first basic controller 110 converts the image data into reproduction colors of the first image former 10, namely, toner colors of the first image former 10 (yellow (Y), magenta (M), cyan (C), and black (K)) as YMCK data and then outputs the YMCK data. The YMCK data includes Y color data, M color data, C color data, and K color data, separated color by color.

The first basic controller 110 notifies the first subordinate controller 120 of the size and material of the paper sheet S related to the received image formation instruction.

The first basic controller 110 also transfers the received image formation instruction to the second controller 200.

Like the first basic controller 110, the first subordinate controller 120 includes a CPU 121, ROM 122, RAM 123, storage 124, and communication unit 125. Using the RAM 123 as a working area, the CPU 121 executes a program read from the ROM 122 or the storage 124 and thus performs the functions of the first subordinate controller 120.

By exchanging control information with the first basic controller 110, the first subordinate controller 120 controls feeding and conveying operations of the paper sheet S and a toner image fixing operation of the fixing device 50 in synchronization with exposure, development, and transfer operations on the first image former 10 and a transfer timing of the paper conveyance device 40.

The first subordinate controller 120 acquires error information about the occurrence of an error, for example, the first image former 10 running out of toner or paper jamming on the paper conveyance device 40. The first subordinate controller 120 notifies the first basic controller 110 of these pieces of error information. The first basic controller 110 causes a display panel of the UI 70 to display the error information, thereby notifying the user of the error information. If the first image former 10 runs out of toner and toner is then replenished, the first subordinate controller 120 acquires information indicating that the error has been resolved. For example, if paper jamming indicated by the error information is resolved, the first subordinate controller 120 acquires information indicating that the error created has been resolved. The first subordinate controller 120 then notifies the first basic controller 110 of the elimination of the error. The first basic controller 110 notifies the user of the elimination of the error by displaying the elimination of the error on the display panel of the UI 70.

Second Controller 200

The second controller 200 includes a second basic controller 210 controlling the operation of the second image former 20 and second subordinate controller 220 controlling, under the control of the second basic controller 210, the operation of the second image former 20. The second basic controller 210 transmits or receives information to or from the first basic controller 110 via a connection line 150.

The second basic controller 210 includes a CPU 211, ROM 212, RAM 213, storage 214, such as a semiconductor memory, and communication unit 215 used to communicate with the outside.

The ROM 212 stores a basic program (such as an operating system) executed by the CPU 211, Using the RAM 213 as a working area, the CPU 211 executes a program read from the ROM 212 and the storage 214. The functions of the second basic controller 210 are performed when the CPU 211 executes the program.

The second basic controller 210 transmits or receives information to or from the second subordinate controller 220, first controller 100 and UI 70 via the communication unit 215.

The second basic controller 210 performs a predetermined image processing operation on the received image data. The second basic controller 210 converts the image data into reproduction colors of the second image former 20, namely, toner colors of the second image former 20 (white color, gold color, silver color, and clear color) as white-colored data, gold-colored data, silver-colored data, and clear-colored data, and outputs the resulting color data.

The second basic controller 210 also notifies the second subordinate controller 220 of the size and material of the paper sheet S related to the received image formation instruction.

The second subordinate controller 220 includes a CPU 221, ROM 222, RAM 223, storage 224, and communication unit 225. Using the RAM 223 as a working area, the CPU 221 executes a program read from the ROM 222 or storage 224, thereby performing the functions of the second subordinate controller 220.

By exchanging control information with the second basic controller 210, the second subordinate controller 220 controls the operations of the second image former 20 including exposure, development, and transfer.

The second subordinate controller 220 acquires error information about the occurrence of an error, for example, about the second image former 20 running out of toner. The second subordinate controller 220 notifies the second basic controller 210 of this piece of error information. The second basic controller 210 causes the display panel of the UI 70 to display the error information, thereby notifying the user of the error information. If the error indicates out of toner and toner is then replenished, the second subordinate controller 220 acquires information indicating chat the error has been resolved. The second subordinate controller 220 notifies the second basic controller 210 of the elimination of the error. The second basic controller 210 notifies the user of the elimination of the error by causing the display panel of the UI 70 to display the elimination of the error.

Cooperation Between First Controller 100 and Second Controller 200

After startup, the first controller 100 and second controller 200 exchange information. The first image former 10 second-transfers the four-color superimposed toner image onto the paper sheet S conveyed by the paper conveyance device 40 that operates under the control of the first controller 100 while the second image former 20 second-transfers the other four-color toner image to the paper sheet S. The operation of the first image former 10 that performs the second transfer of the four-color superimposed toner image onto the paper sheet S is also stated as "the first image former 10 forms an image." Furthermore, the operation of the second image former 20 that performs the second transfer of the other four-color superimposed toner image onto the paper sheet S is also stated as "the second image former 20 forms an image."

The process performed by the first controller 100 and second controller 200 is described below. After acquiring an image formation instruction output from an application, the printer driver in the terminal apparatus 9 converts the image formation instruction into a command for the first basic controller 110 and second basic controller 210 if the image formation instruction is an instruction causing the first image former 10 and second image former 20 to form an image. The printer driver outputs the command to the first basic controller 110. The terminal apparatus 9 outputs the image formation instruction to the first basic controller 110. The image formation instruction causing the first image former 10 and second image former 20 to form an image is also referred to as a "cooperation instruction." The terminal apparatus 9 transmits the cooperation instruction to the first basic controller 110. The terminal apparatus 9 includes, in the cooperation instruction, information indicating that an image is to be formed on the first image former 10 and second image former 20.

The instruction output from the application may indicate that an image is to be formed on the first image former 10 but is not to be formed on the second image former 20 (for example, an instruction is that an image is to be formed using the toners on the first image former 10 without using the toners of the second image former 20 or the user instructs, using the printer driver on the terminal apparatus 9, image formation to be performed only on the first image former 10). In such a case, the printer driver in the terminal apparatus 9 converts the image formation instruction into the command for the first basic controller 110. The printer driver thus outputs the command to the first basic controller 110. In this way, the terminal apparatus 9 transmits the image formation instruction to the first basic controller 110. In the discussion that follows, the image formation instruction indicating that an image is to be formed on the first image former 10 but is not to be formed on the second image former 20 is hereinafter referred to as a "first individual instruction." The terminal apparatus 9 transmits the first individual instruction to the first basic controller 110. The terminal apparatus 9 includes, in the first individual instruction, information indicating that an image is to be formed on the first image former 10 but is not to be formed on the second image former 20.

The instruction output from the application may indicate that an image is to be formed on the second image former 20 but is not to be formed on the first image former 10 (for example, an instruction is that an image is to be formed using the toners on the second image former 20 without using the toners of the first image former 10 or the user instructs, using the printer driver on the terminal apparatus 9, image formation to be performed only on the second image former 20). In such a case, the printer driver in the terminal apparatus 9 converts the image formation instruction into the command for the first basic controller 110 and the second basic controller 210. The printer driver thus outputs the command to the first basic controller 110. If the image formation is to be performed on the second image former 20 but is not to be performed on the first image former 10, the first basic controller 110 may still control the paper conveyance device 40, fixing device 50, and the like. The printer driver thus converts the instruction output from the application into the command used for the first basic controller 110 to control the paper conveyance device 40, fixing device 50, and the like. The printer driver outputs the command to the first basic controller 110. The terminal apparatus 9 transmits the image formation instruction to the first basic controller 110. In the following discussion, the image formation instruction indicating that an image is to be formed on the second image former 20 and indicating that an image is not formed on the first image former 10 may be referred to as a "second individual instruction." The terminal apparatus 9 transmits the second individual instruction to the first basic controller 110. If the first individual instruction and second individual instruction, if not differentiated from each other, are simply referred to as an "individual instruction."

In accordance with information included in the image formation instruction from the terminal apparatus 9, the first basic controller 110 determines whether the image formation instruction is a cooperation instruction, first individual instruction, or second individual instruction. If the image formation instruction is a first individual instruction, the first basic controller 110 performs an image formation process responsive to the first individual instruction. If the image formation instruction is a second individual instruction, the first basic controller 110 transfers the second individual instruction to the second basic controller 210. The first basic controller 110 and second basic controller 210 perform the image formation process responsive to the second individual instruction. These processes are described below in greater detail.

If the image formation instruction is a cooperation instruction, the first basic controller 110 waits until another cooperation instruction having the same identification information arrives. The first basic controller 110 then transfers to the second basic controller 210 the cooperation instruction responsive to a used color material having a second color composition out of the two cooperation instructions having the same identification information. The first basic controller 110 and second basic controller 210 then perform the image formation process responsive to the cooperation instruction.

Figure 6A:
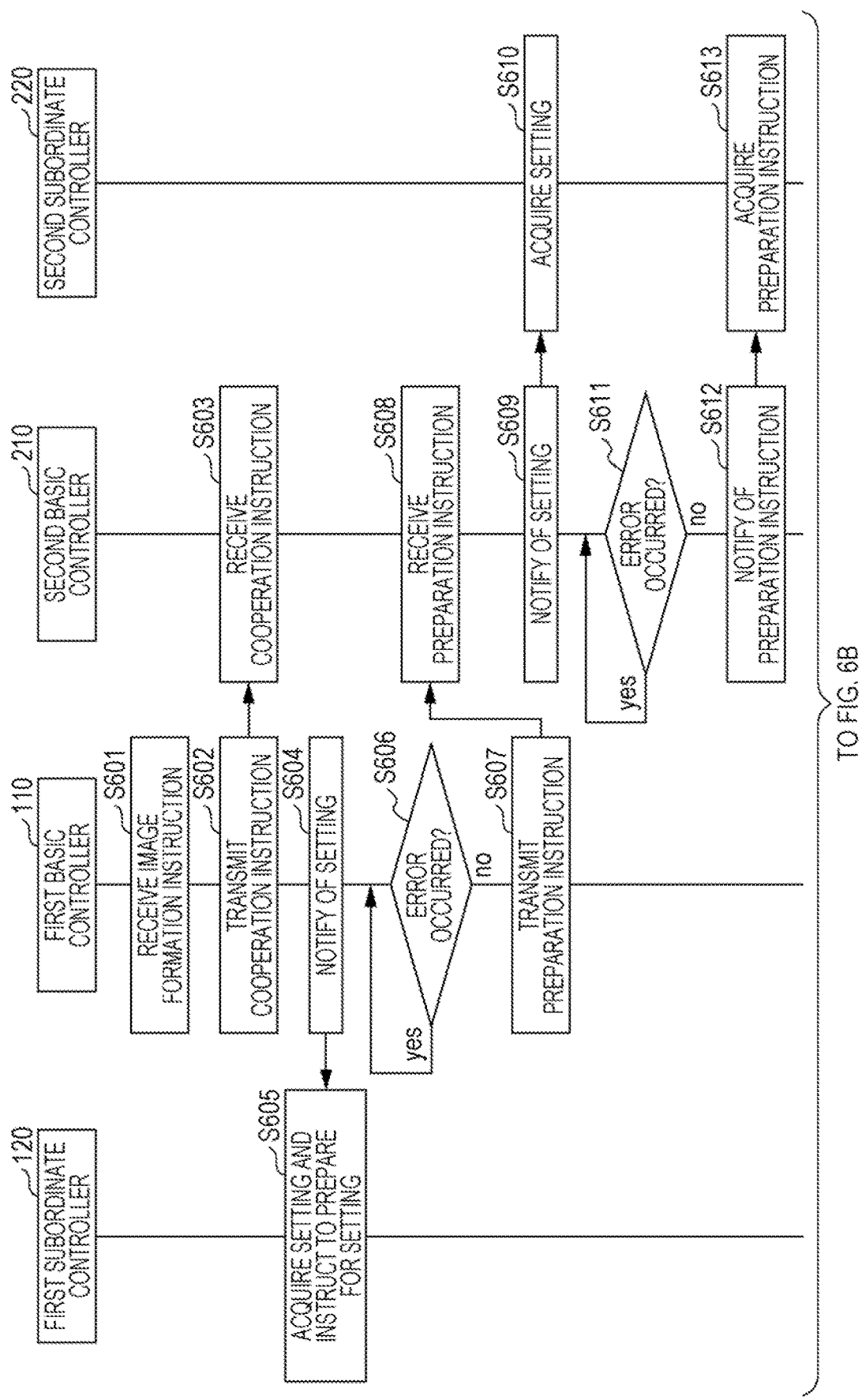

FIGS. 6A and 6B illustrate an example of the process performed by the first controller 100 and second controller 200. The process in FIGS. 6A and 6B is performed when the first controller 100 receives the cooperation instruction. Referring to FIGS. 6A and 6B, another cooperation instruction having the same (identical) identification information is received within a predetermined period of time from the reception of one cooperation instruction.

Upon receiving the image formation instruction from the terminal apparatus 9 via the communication unit 115, the first basic controller 110 verifies whether the image formation instruction is a cooperation instruction or an individual instruction (S601). If the image formation instruction is a cooperation instruction, the first basic controller 110 determines whether a cooperation instruction having the same identification information has beer, received within the predetermined period of time. If the first basic controller 110 determines that the cooperation instruction having the same identification information has been received, the first basic controller 110 transfers to the second basic controller 210 the cooperation instruction, with the used color material having the second color composition, out of the two cooperation instructions having the same identification information (S602). The second basic controller 210 receives the cooperation instruction from the first basic controller 110 (S603).

The first basic controller 110 notifies the first subordinate controller 120 of the setting of the specified image formation (S604). The first subordinate controller 120 acquires the setting of the image formation and instructs preparation for the image formation (S605). The preparation for the image formation includes an operation to make the paper conveyance device 40 ready to convey the paper sheet S (hereinafter referred to as "conveyance preparation") and, for example, includes starting motor's that drive a variety of rollers including the feed roller 44. The preparation for the image formation also includes an operation to make the fixing device 50 ready to fix a toner image onto the paper sheet S and, for example, includes raising temperature of the heat roller 51.

The first basic controller 110 determines whether an error, such as the first image former 10 being running out of toner, or paper jamming, has occurred (S606). If no error has occurred (no path in S606), the first basic controller 110 transmits to the second basic controller 210 a preparation instruction indicating that the image formation preparation is to be performed on the second image former 20 (S607). On the other hand, if an error has occurred (yes path in S606), the first basic controller 110 waits on standby until the error is resolved.

The second basic controller 210 receives the preparation instruction from the first basic controller 110 (S608). The second basic controller 210 notifies the second subordinate controller 220 of the setting of the image formation (S609). In this way, the second subordinate controller 220 acquires the setting of the image formation (S610).

The second basic controller 210 determines whether an error, such as the second image former 20 running out of tonner, has occurred (S611). If no error has occurred (no path in S611), the second basic controller 210 notifies the second subordinate controller 220 of the preparation instruction indicating that the image formation preparation is to be performed on the second image former 20 (S612). After acquiring the preparation instruction (S613), the second subordinate controller 220 instructs the second image former 20 to prepare for the image formation (S614). The image formation preparation includes an operation to make the second image former 20 ready to form an image on the paper sheet S and, for example, includes warmup, image quality adjustment operation, and automatic disposal of deteriorated toner of the development device 25. Each of these operations involves consuming power or consuming toner. Upon completing the image formation preparation, the second image former 20 shifts to a standby state. If an error has occurred (yes path in S611), the second basic controller 210 waits on standby until the error is resolved.

When the information formation preparation of the second image former 20 is complete, the second basic controller 210 transmits to the first basic controller 110 a completion notification indicating that the preparation is complete (S615). If the second basic controller 210 receives the notification of the preparation completion from the second image former 20 after the second subordinate controller 220 instructs to prepare for the image formation (S614), the second basic controller 210 may determine that the image formation preparation of the second image former 20 is complete. If a predetermined period of time has elapsed since the instruction of the second subordinate controller 220 for the image formation preparation (S614), the second basic controller 210 may determine that the image formation preparation of the second image former 20 is complete.

After receiving the completion notification from the second basic controller 210 (S616), the first basic controller 110 notifies the first subordinate controller 120 of a preparation instruction indicating that the image formation preparation of the first image former 10 is to be performed (S617). After acquiring the preparation instruction (S618), the first subordinate controller 120 instructs the first image former 10 to prepare for the image formation (S619). The image formation preparation may include warmup, image quality adjustment operation, and automatic disposal of deteriorated toner of the development device 15. Upon completing the image formation preparation, the first image former 10 shifts to a standby state.

When the image formation preparation of the first image former 10 is complete, the first subordinate controller 120 causes the paper conveyance device 40 to start conveying the paper sheet S (S620) and causes the first image former 10 to form an image on the incoming paper sheet S (S621). If the first basic controller 110 receives the notification of the preparation completion after instructing the image formation preparation (S617), the first basic controller 110 may determine that the image formation preparation of the first image former 10 is complete. If a predetermined period of time has elapsed since instructing the image formation preparation (S617), the first basic controller 110 may determine that the image formation preparation of the first image former 10 is complete.

The second subordinate controller 220 causes the second image former 20 to form an image on the incoming paper sheet S (S622).

The first subordinate controller 120 causes the fixing device 50 to fix the toner image onto the incoming paper sheet S, and completes the image formation by discharging the paper sheet S having undergone fixing into the paper sheet discharge tray 60 (S623).

The first subordinate controller 120 notifies the first basic controller 110 of a notification that the image formation is complete (S624). After acquiring the completion notification (S625), the first basic controller 110 transmits to the second basic controller 210 the completion notification indicating the completion of the image formation (S626).

After receiving the completion notification (S627), the second basic controller 210 transmits to the first basic controller 110 a notification that the completion notification has been received (S628).

After receiving the notification that the completion notification has been received (S629), the first basic controller 110 ends the image formation process (S630). The end of the image formation process includes the end of the formation operation of the toner image on the first image former 10 and a deletion operation deleting information related to the image formation at the present cycle and stored on the RAM 113 or the storage 114.

The second basic controller 210 ends the image formation process (S631) after transmitting to the first basic controller 110 the notification that the completion notification has been received (S628). The end of the image formation process includes the end of the formation of the toner image on the second image former 20 and the deletion operation deleting information related to the image formation at the present cycle and stored on the RAM 213 or the storage 214.

According to the exemplary embodiment, the image formation is performed with the first controller 100 and second controller 200 operating in cooperation.

For example, if no error has occurred in the first image former 10 and the paper conveyance device 40, serving as a control target of the first basic controller 110, the first basic controller 110 transmits to the second basic controller 210 the preparation instruction indicating that the image formation preparation of the second image former 20 is to be performed (S607). If no error has occurred on the second image former 20, serving as a control target of the second basic controller 210, after the preparation instruction is received (S608), the second basic controller 210 notifies the second subordinate controller 220 of the preparation instruction indicating that the image formation preparation of the second image former 20 is to be performed (S612). When the image formation preparation of the second image former 20 is complete, the second basic controller 210 transmits to the first basic controller 110 the completion notification indicating that the preparation is complete (S615). After receiving the completion notification (S616), the first basic controller 110 notifies the first subordinate controller 120 of the preparation instruction indicating that the image formation preparation of the first image former 10 is to be performed (S617).

If the first controller 100 and second controller 200 do not cooperate but operate independently from each ocher, a time lag may occur between the image formation process start timing in the first image former 10 and the image formation process start timing in the second image former 20. The arrangement described above may control such a timing problem. For example, although the image formation preparation of the second image former 20 is unfinished, the paper conveyance on the paper conveyance device 40 or the image formation process on the first image former 10 may start, leading to causing the image formation process on the second image former 20 to be not in time. The arrangement described above may control such a timing problem.

Power may be wasted if the second image former 20 may be left in a standby state for a longer period of time with an error present on the first image former 10 or the paper conveyance device 40. The arrangement described above may control such waste of power. Power may be wasted if the first image former 10 may be left in a standby state for a longer period of time with an error present on the second image former 20. The arrangement described above may control such waste of power.

According to the exemplary embodiment, when the image formation is complete, the first basic controller 110 transmits to the second basic controller 210 the completion notification indicating that the image formation is complete (S626). After receiving the completion notification (S627), the second basic controller 210 transmits to the first basic controller 110 the notification that the completion notification has been received (S628).

In this way, the arrangement described above may control the situation that the second controller 200 goes unnoticed of the completion of the image formation after the fixing operation on the fixing device 50.

Process Performed in Response to Reception of First Individual Instruction

FIG. 7 illustrates an example of the process performed by the first controller 100 when the first basic controller 110 receives the first individual instruction.

When the first individual instruction is received (S701), the first basic controller 110 notifies the first subordinate controller 120 of the setting of the image formation responsive to the first individual instruction (S702). In this way, the first subordinate controller 120 acquires the setting of the image formation responsive to the first individual instruction and instructs to prepare for the image formation (S703), The first basic controller 110 then determines whether an error has occurred (S704). If an error has occurred (yes path in S704), the first basic controller 110 waits until the error is resolved. On the other hand, if no error has occurred (no path in S704), the first basic controller 110 notifies the first subordinate controller 120 of a preparation instruction indicating that the image formation preparation of the first image former 10 is to be performed in response to the individual instruction (S705).

After acquiring the preparation instruction (S706), the first subordinate controller 120 instructs the first image former 10 to prepare for the image formation (S707). When the image formation preparation of the first image former 10 is complete, the first subordinate controller 120 causes the paper conveyance device 40 to start conveying the paper sheet S (S708) and causes the first image former 10 to form an image on the incoming paper sheet S (S709). The first subordinate controller 120 causes the fixing device 50 to fix a toner image onto the incoming paper sheet S and completes the image formation by discharging the paper sheet S having undergone the fixing to the paper sheet discharge tray 60 (S710). The first subordinate controller 120 notifies the first basic controller 110 of a notification that the image formation is complete (S711). After acquiring the completion notification (S712), the first basic controller 110 ends the image formation process (S713).

Process Performed in Response to Reception of Second Individual Instruction

Figure 8A:
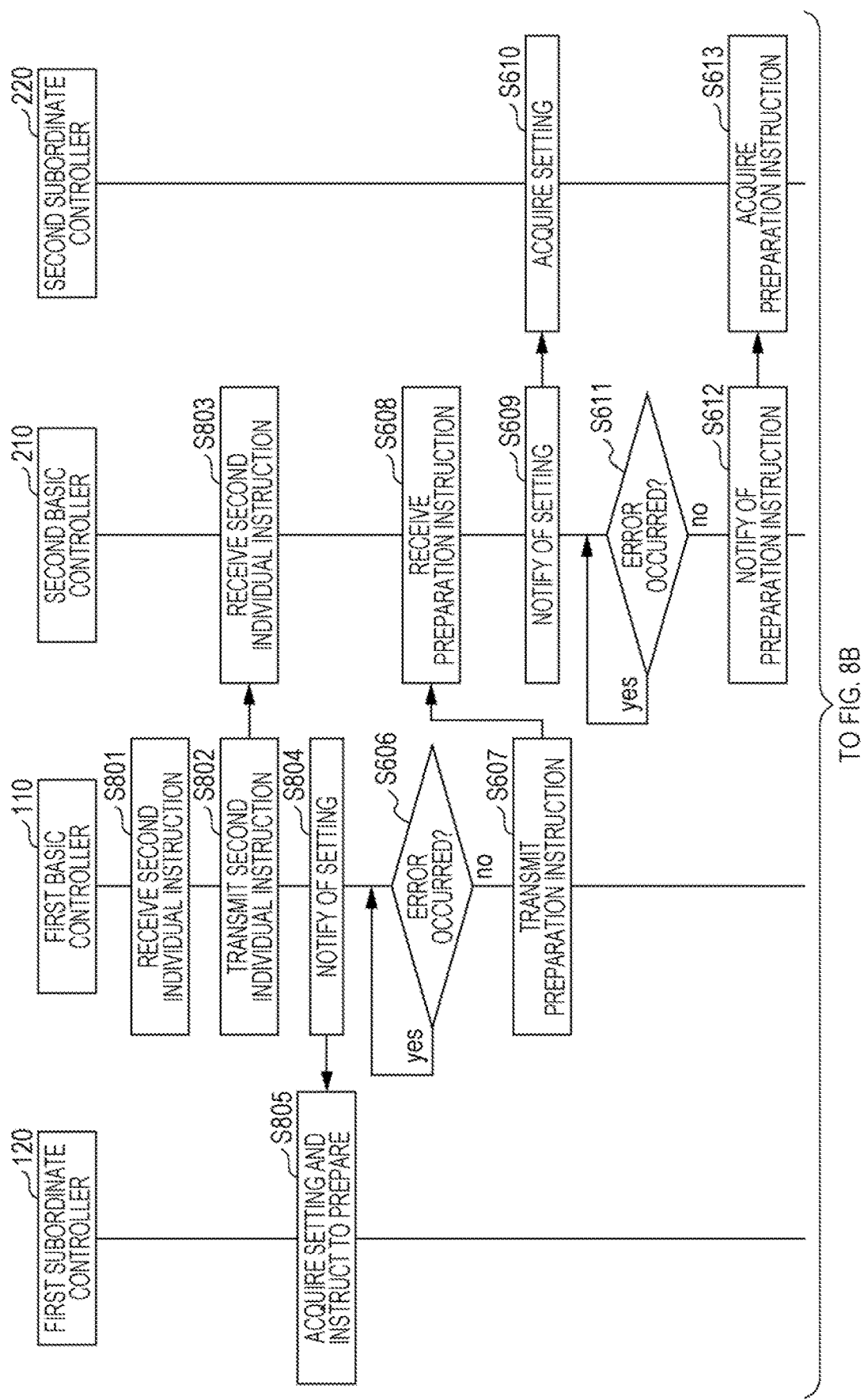

FIGS. 8A and 8B illustrate an example of a process performed by the first controller 100 and second controller 200 when the first basic controller 110 receives the second individual instruction. Referring to FIGS. 8A and 8B, like operations in FIGS. 6A and 6B are designated with like reference numerals and the discussion thereof is omitted herein.

Upon receiving the second individual instruction (S801), the first basic controller 110 transmits the second individual instruction to the second basic controller 210 via the connection line 150 (S802). The second basic controller 210 receives the second individual instruction from the first basic controller 110 (S803). The first basic controller 110 notifies the first subordinate controller 120 of a setting responsive to the second individual instruction (S804).

The first subordinate controller 120 acquires the setting responsive to the second individual instruction and provides an instruction to prepare for the image formation (S805). In this way, the paper conveyance device 40 and fixing device 50 performs preparation for the image formation, such as preparation for paper conveyance and fixing.

The first controller 100 and second controller 200 perform steps S606 through S616 as described above.

After receiving the completion notification (S616), the first basic controller 110 notifies the first subordinate controller 120 of a notification of no preparation indicating that the paper conveyance and fixing are to be performed in the image formation on the second image former 20 with the image formation preparation not performed on the first image former 10 (S817). After acquiring the notification of no preparation (S818), the first subordinate controller 120 causes the paper conveyance device 40 to start conveying the paper sheet S (S819).

The second subordinate controller 220 causes the second image former 20 to form an image on the incoming paper sheet S (S622).

The first controller 100 and second controller 200 performs operations in S623 through S631 as described above.

Process Performed When Cooperation Instruction Having Same Identification Information is Not Received Within Predetermined Period of Time In the process in FIGS. 6A and 6B, after one cooperation instruction is received, another cooperation instruction having the same identification information is received within a predetermined period of time. However, the cooperation instructions for the first image I1 and the second image I2 to be superimposed are different in identification information and two cooperation instructions having the same identification information may not be received within the predetermined period of time. For example, the predetermined period of time may be 1 minute.

The original document M created using an application may be the letter A with a silver-colored rectangular background as illustrated in FIG. 4. The image formation instruction of the original document M includes the first image formation instruction for the letter A and the second image formation instruction for the silver-colored rectangular background. The first image formation instruction and second image formation instruction for the original document M created using the one application includes the same identification information.

An image of characters created using different applications may be formed on the paper sheet S. The same identification information may not be included in the two image formation instructions output from the different applications. For example, if the application having created the letter A is different from the application having created the silver-colored background, the same identification information may not be included in the first image formation instruction to form the image of the letter A and the second image formation instruction to form the image of the silver-colored background.

Similarly, even if the image of the letter created on different terminal apparatuses 9 is formed on a single paper sheet S, the same identification information may not be included in the two image formation instructions respectively output from the different terminal apparatuses 9. For example, if the terminal apparatus 9 having created the letter A is different from the terminal apparatus 9 having created the silver-colored background, the same identification information may not be included in the first image formation instruction output from one terminal apparatus 9 to form the image of the letter A on the paper sheet S and the second image formation instruction output from the ocher terminal apparatus 9 which is different from the one terminal apparatus 9 and forms the silver-colored background on the same paper sheet S. Even when the image is created using the same application (such as Microsoft Powerpoint (registered trademark)) with the different terminal apparatuses 9 utilized, the same identification information may not be included.

In view of the discussion above, the first basic controller 110 performs a process described below if two cooperation instructions having the same identification information are not received within the predetermined period of time.

If another cooperation instruction having the same identification information is not received during a predetermined period of time after the reception of one cooperation instruction, the first basic controller 110 stores information on the one cooperation instruction on the memory region of the RAM 113, the storage 114 or the like. The first basic controller 110 prompts selection of a combination of images responsive to the cooperation instructions by causing the display panel of the UI 70 to display information related to the cooperation instruction stored the memory region.

Figure 9A:
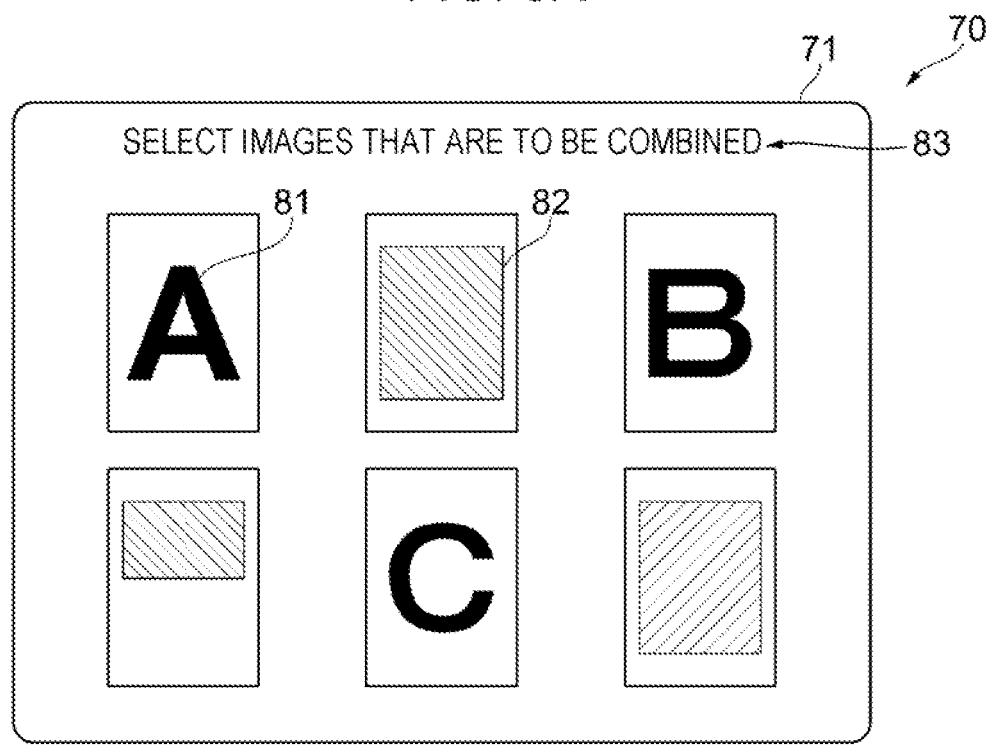
FIGS. 9A and 9B illustrate examples of a first selection screen displayed on a user interface (UI)
Figure 9B:
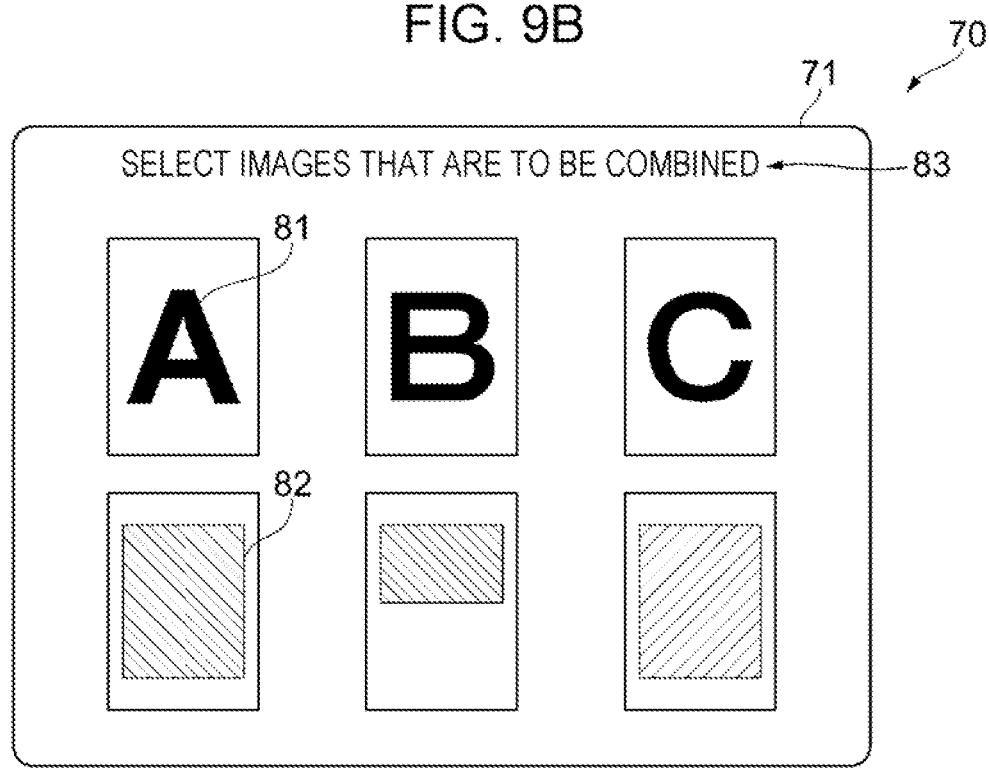

FIGS. 9A and 9B illustrate an example of a first selection screen 71 displayed on the UI 70.

The first basic controller 110 causes the UI 70 to display, as related information, a first corresponding image 81 responsive to the first image I1 formed by the first image former 10 and a second corresponding image 82 responsive to the second image I2 formed by the second image former 20. The first basic controller 110 also causes the UI 70 to display a message 83 prompting selection of two images to be superimposed. The first corresponding image 81 and second corresponding image 82, if not differentiated, are collectively referred to as a "corresponding image."

A preview image may be displayed on the display 93 on the terminal apparatus 9 as a result of simulating an image to be formed on the paper sheet S before outputting a created document responsive to an image formation instruction. Like the preview image, the corresponding images are the first image I1 and second image I2 that are displayed on the UI 70 as a result of simulation. Referring to FIG. 9A, the first basic controller 110 displays the corresponding images in the order of reception in a direction from top right to left on the UI 70. The order of displaying the corresponding images on the UI 70 is not limited to the order of reception. Referring to FIG. 9B, the first basic controller 110 may display the corresponding images on the UI 70 with the row for the first corresponding image 81 being different from the row for the second corresponding image 82.

The message 83 prompts the user to select a combination of the first image I1 and second image I2 that are to be superimposed to each other on a single paper sheet S. For example, the message 83 may be "Select images that are to be combined," or "Select images that are to be superimposed to each other." The message 83 is not limited to these messages.

If one corresponding image is selected from multiple corresponding images displayed on the first selection screen 71 of the UI 70, the first basic controller 110 causes the UI 70 to display a second selection screen 72. The second selection screen 72 is utilised to select a corresponding image responsive to an image (the second image I2 or the first image I1) that is to be superimposed to an image (the first image I1 or the second image I2) responsive to the one corresponding image. The selection of the corresponding image signifies that the corresponding image displayed on the UI 70 is pressed or touched.

Figure 10A:
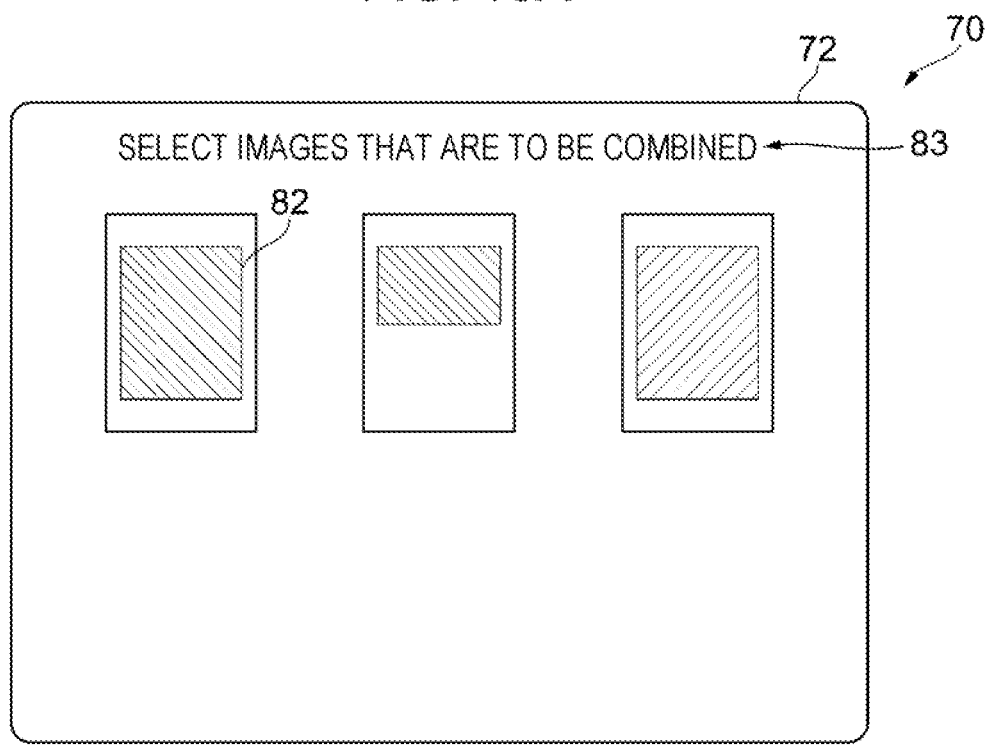
FIGS. 10A and 10B illustrate examples of a second selection screen displayed on the UI.
Figure 10B:
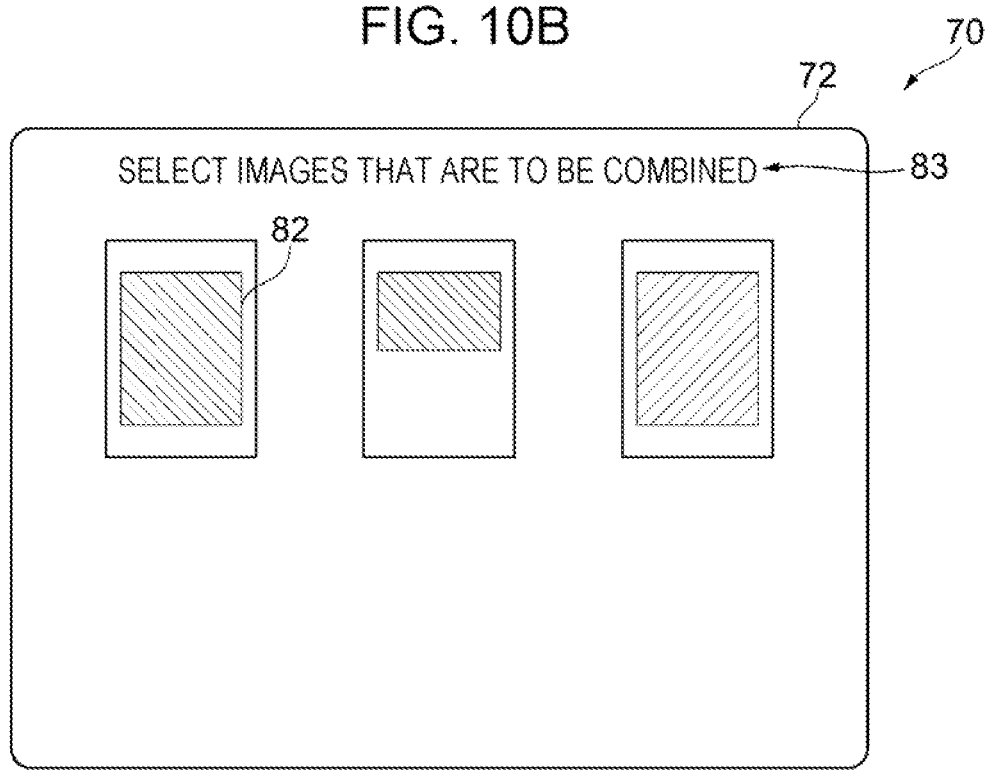

FIGS. 10A and 10B illustrate an example of the second selection screen 72 displayed on the UI 70. The first basic controller 110 does not cause the second selection screen 72 to display a corresponding image having the same color composition as the color composition of the corresponding image selected on the first selection screen 71 but causes the second selection screen 72 to display a corresponding image having a color composition different from the color composition of the corresponding image selected on the first selection screen 71. Specifically, the first basic controller 110 causes the first selection screen 71 to display both the first corresponding image 81 responsive to the first image I1 and the second corresponding image 82 responsive to the second image I2. If one corresponding image is selected from the corresponding images displayed on the first selection screen 71, the first basic controller 110 determines whether the one corresponding image is the first corresponding image 81 or the second corresponding image 82. If the first basic controller 110 determines that the one corresponding image is the first corresponding image 81, the first basic controller 110 causes the second selection screen 72 to display not the first corresponding image 81 but the second corresponding image 82 as illustrated in FIG. 10. On the other hand, if the first basic controller 110 determines that the one corresponding image is the second corresponding image 82, the first basic controller 110 causes the second selection screen 72 to display not the second corresponding image 82 but the first corresponding image 81. This may control erroneous selection by the user.

If one of the corresponding images displayed on the second selection screen 72 is selected, the first basic controller 110 equalizes the identification information of two cooperation instructions respectively responsive to the corresponding image selected on the first selection screen 71 and the corresponding image selected on the second selection screen 72. The first basic controller 110 transmits to the second basic controller 210 the cooperation instruction, responsive to the second color composition, out of the two cooperation instructions having the same identification information.

The first controller 100 and second controller 200 perform operations in S604 and subsequent steps described with reference to FIG. 6A.

The process of the first basic controller 110 is described with reference to flowcharts.

Figure 11:
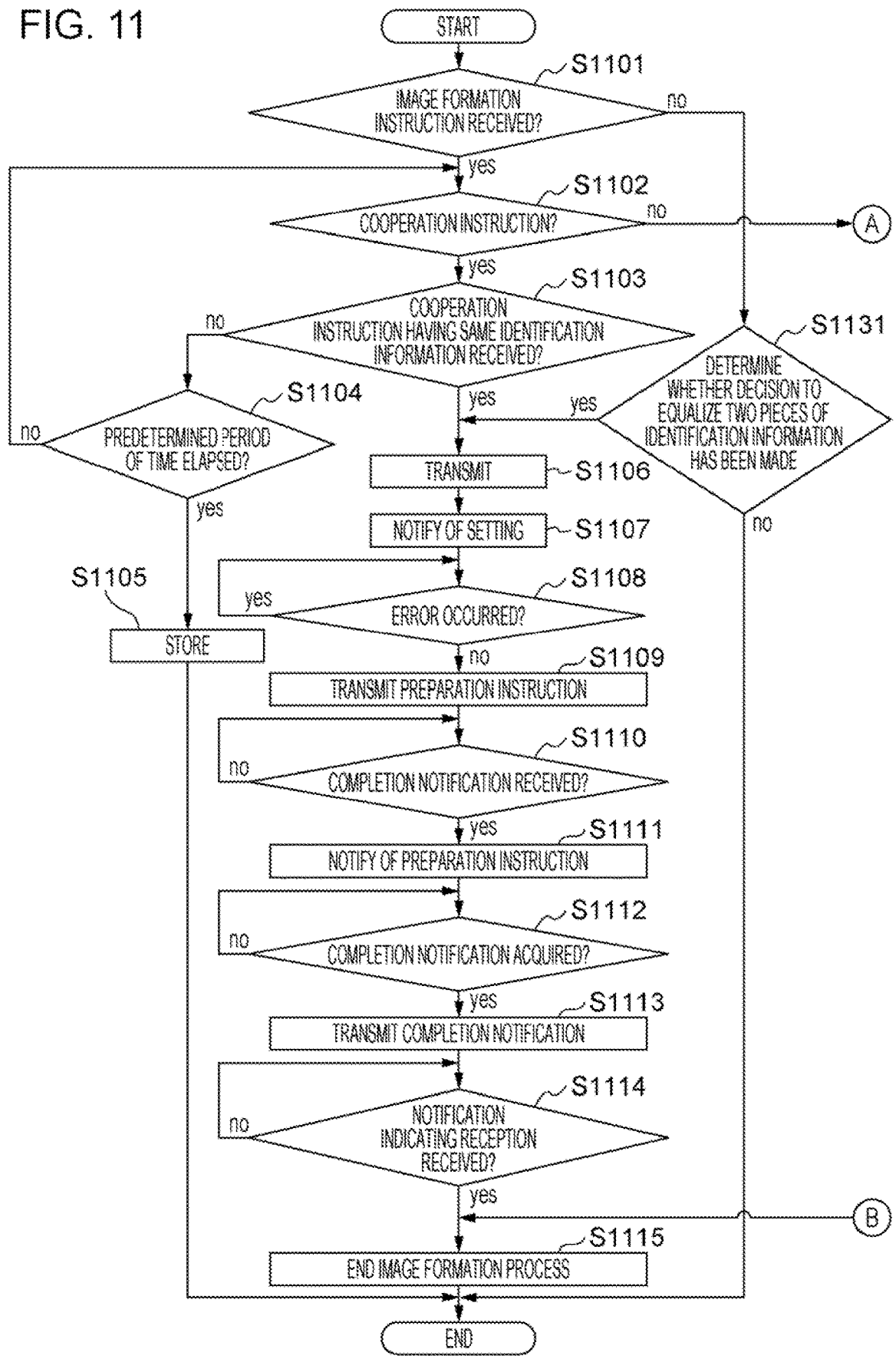
FIG. 11 is a flowchart illustrating an example of a process of the first basic controller.
Figure 12:
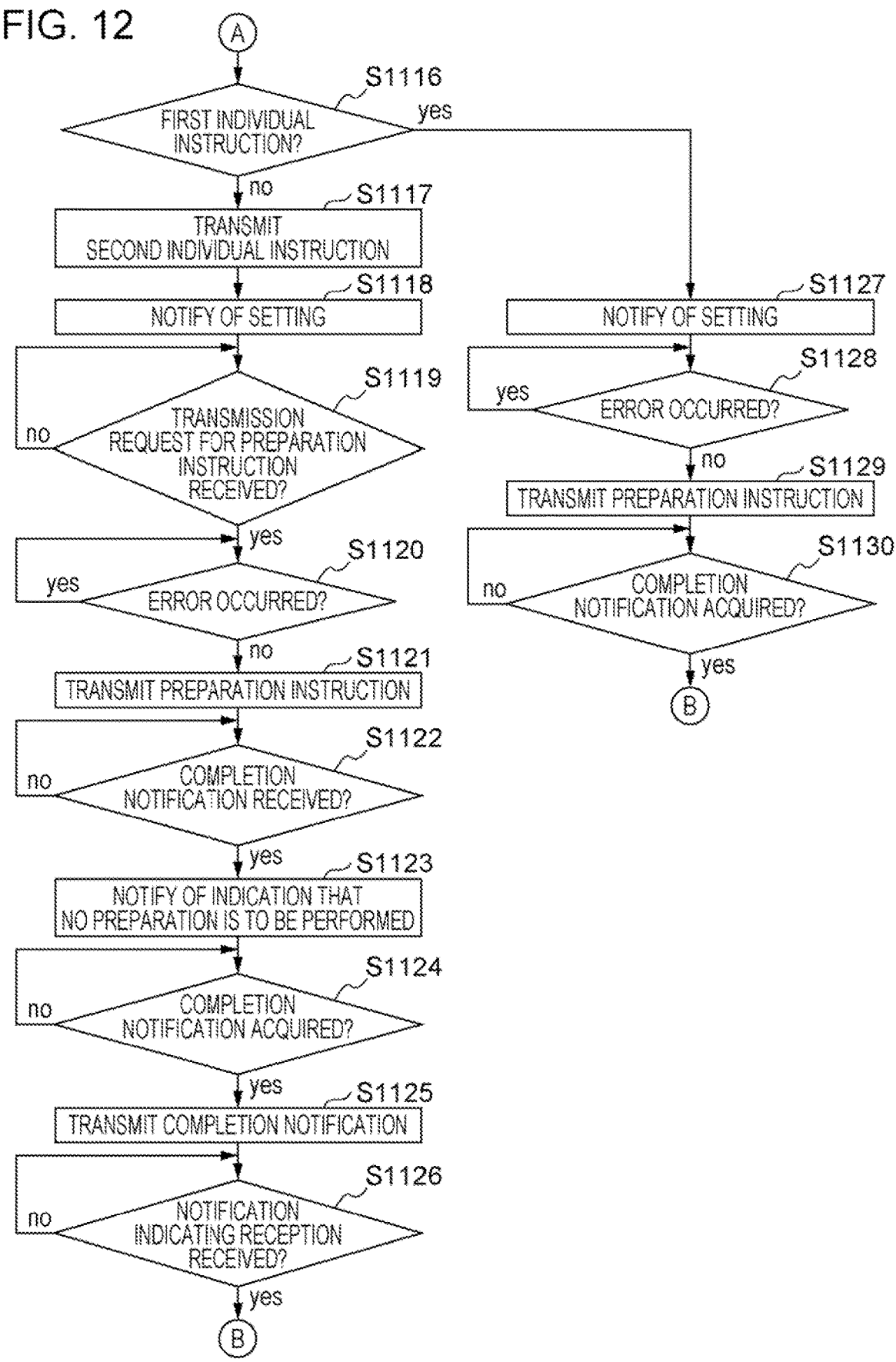
FIG. 12 is a flowchart illustrating an example of the process of the first basic controller.

FIGS. 11 and 12 are the flowcharts illustrating an example of the process of the first basic controller 110. The first basic controller 110 iterates the process every predetermined period of time (for example, every 1 millisecond).

The first basic controller 110 determines whether an image formation instruction has been received from the terminal apparatus 9 via the communication unit 115 (S1101). If the image formation instruction has been received (yes path in S1101), the first basic controller 110 checks whether the image formation instructions is a cooperation instruction or individual information and thus determines whether the cooperation instruction has been received (S1102). If the image formation instruction is a cooperation instruction (yes path in S1102), the first basic controller 110 determines whether another cooperation instruction having the same identification information has been received (S1103). If another cooperation instruction having the same identification information has not been received (no path in S1103), the first basic controller 110 determines whether a predetermined period of time has elapsed (S1104). If the predetermined period of time has not elapsed (no path in S1104), the first basic controller 110 performs operations in S1102 and subsequent operations. On the other hand, if the predetermined period of time has elapsed (yes path in S1104), the first basic controller 110 stores information on the cooperation instruction onto a memory region, such as the RAM 113, the storage 114, or the like (S1105). The process thus ends.

If another cooperation instruction having the same identification information has been received (yes path in S1103), the first basic controller 110 transmits to the second basic controller 210 the cooperation instruction (an example of the second image formation instruction), corresponding to the second color composition, out of the two image formation instructions having the same identification information (S1106). The first basic controller 110 notifies the first subordinate controller 120 of the setting of the image formation responsive to the cooperation instruction in order to cause the first image former 10 to form the first image I1 in accordance with the cooperation instruction responsive to the first color composition (an example of the first image formation instruction) (S1107). The operation in S1107 corresponds to the operation in S604 described with reference to FIG. 6A.

The first basic controller 110 determines whether an error has occurred (S1108). If an error has occurred (yes path in S1108), the first basic controller 110 waits on standby until the error is resolved. On the other hand, if no error has occurred (no path in S1108), the first basic controller 110 transmits to the second basic controller 210 a preparation instruction indicating that the image formation preparation of the second image former 20 is to be performed (S1109). The operations in S1108 and S1109 respectively correspond to the operations in S606 and S607 described with reference to FIG. 6A.

The first basic controller 110 determines whether a completion notification has been received from the second basic controller 210 (S1110). If the completion notification has not been received (no path in S1110), the first basic controller 110 waits on standby until the completion notification is received. On the other hand, if the completion notification has been received (yes path in S1110 (corresponding to the operation in S616 described with reference to FIG. 6B)), the first basic controller 110 notifies the first subordinate controller 120 of a preparation instruction indicating that the image formation preparation of the first image former 10 is to be performed (S1111). The operation in S1111 corresponds to the operation in step S617 described with reference to FIG. 6B.

The first basic controller 110 determines whether a completion notification indicating the completion of the image formation has been acquired from the first subordinate controller 120 (S1112). If the completion notification has not been acquired (no path in S1112), the first basic controller 110 waits on standby until the completion notification is acquired. On the other hand, if the completion notification has been acquired (yes path in S1112), the first basic controller 110 transmits to the second basic controller 210 the completion notification indicating the completion of the image formation (S1113). The operation in S1113 corresponds to the operation in S626 described with reference to FIG. 6B.

The first basic controller 110 determines whether a notification indicating the reception of the completion notification has been received from the second basic controller 210 (S1114). If the notification indicating the reception of the completion notification has not been received (no path in S1114), the first basic controller 110 waits on standby until the completion notification is received. On the other hand, if the completion notification has been received (yes path in S1114 (corresponding to the operation in S629 described with reference to FIG. 6B)), the first basic controller 110 ends the image formation process (S1115).

If the image formation instruction is not a cooperation instruction (no path in S1102), the first basic controller 110 determines whether a first individual instruction has been received (S1116). If a first individual instruction has not been received (no path in S1116), the image formation instruction received in S1101 is a second individual instruction. The first basic controller 110 thus transmits the second individual instruction to the second basic controller 210 (S1117). The first basic controller 110 notifies the first subordinate controller 120 of the setting for the image formation responsive to the second individual instruction (S1118). The operation in S1118 corresponds to the operation in S802 described with reference to FIG. 8A. The first basic controller 110 determines whether a transmission request for preparation instruction has been received (S1119). If the transmission request for preparation instruction has not been received (no path in S1119), the first basic controller 110 waits on standby until the transmission request is received. On the other hand, if the transmission request for preparation instruction has been received (yes path in S1119 (corresponding to the operation in S605 described with reference to FIG. 6A)), the first basic controller 110 determines whether an error has occurred (S1120). If an error has occurred (yes path in S1120), the first basic controller 110 waits on standby until the error is resolved. On the other hand, if no error has occurred (no path in S1120), the first basic controller 110 transmits to the second basic controller 210 a preparation instruction indicating that the image formation preparation of the second image former 20 is to be performed (S1121). The operations in S1120 and S1121 correspond to the operations in S606 and S607, respectively, in FIG. 6A.

The first basic controller 110 determines whether a completion notification has been received from the second basic controller 210 (S1122). If the completion notification has not been received (no path in S1122), the first basic controller 110 waits on standby until the completion notification is received. On the other hand, if the completion notification has been received (yes path in S1122 (corresponding to the operation in S616 in FIG. 8B)), the first basic controller 110 transmits to the first subordinate controller 120 a notification that no preparation is to be performed (S1123), and then performs operations in S1124 and subsequent steps. The operation in S1123 corresponds to the operation in S817 in FIG. 8B.

The first basic controller 110 determines whether a completion notification indicating the completion of the image formation has been acquired from the first subordinate controller 120 (S1124). If the completion notification has not been acquired (no path in S1124), the first basic controller 110 waits on standby until the completion notification is acquired. On the other hand, if the completion notification has been acquired (yes path in S1124), the first basic controller 110 transmits to the second basic controller 210 the completion notification indicating the completion of the image formation (S1125). The operation in S1125 corresponds to the operation in S626 described with reference to FIG. 8B.

The first basic controller 110 determines whether the completion notification has been received from the second basic controller 210 (S1126). If the completion notification has not been received (no path in S1126), the first basic controller 110 waits on standby until the completion notification is received. On the other hand, if the completion notification has been received (yes path in S1126 (corresponding to the operation in S629 described with reference to FIG. 8B)), the first basic controller 110 ends the image formation process (S1115).

If the first individual instruction has been received (yes path in S1116), the first basic controller 110 notifies the first subordinate controller 120 of the setting for the image formation responsive to the first individual instruction (S1127). The operation in S1127 corresponds to the operation in S702 described with reference to FIG. 7.

The first basic controller 110 determines whether an error has occurred (S1128). If an error has occurred (yes path in S1128), the first basic controller 110 waits on standby until the error is resolved. If no error has occurred (no path in S1128), the first basic controller 110 notifies the first subordinate controller 120 of a preparation instruction indicating that the image formation preparation of the first image former 10 is to be performed (S1129). The operation in S1129 corresponds to the operation in S705 with reference to FIG. 7.

The first basic controller 110 determines whether the completion notification indicating the completion of the image formation has been acquired from the first subordinate controller 120 (S1130). If the completion notification has not been acquired (no path in S1130), the first basic controller 110 waits on standby until the completion notification is acquired. On the other hand, if the completion notification has been received (yes path in S1130 (corresponding to the operation in S712 described with reference to FIG. 7)), the first basic controller 110 ends the image formation process (S1115).

If the image formation instruction has net been received (no path in S1101), the first basic controller 110 determines whether a decision to equalize two pieces of the identification information, as described below with reference to S1306 in FIG. 13, has been made (S1131). If the decision has not been made (no path in S1131), the first basic controller 110 ends the process. On the other hand, if the decision has been made (yes path in S1131), the first basic controller 110 performs operations in S1106 and subsequent steps. Specifically, the first basic controller 110 transmits to the second basic controller 210 the cooperation instruction (S1106), responsive to the second color composition, out of the two cooperation instructions having the same identification information that the first basic controller 110 has decided to equalize in S1306. In order for the first image former 10 to form the first image I1 in accordance with the cooperation instruction responsive to the first color composition, the first basic controller 110 notifies the first subordinate controller 120 of the setting of the image formation responsive to the cooperation instruction (S1107). The first basic controller 110 then performs operations in step S1108 and subsequent steps.

A combination determination process performed by the first basic controller 110 is described with reference to a flowchart.

Figure 13:
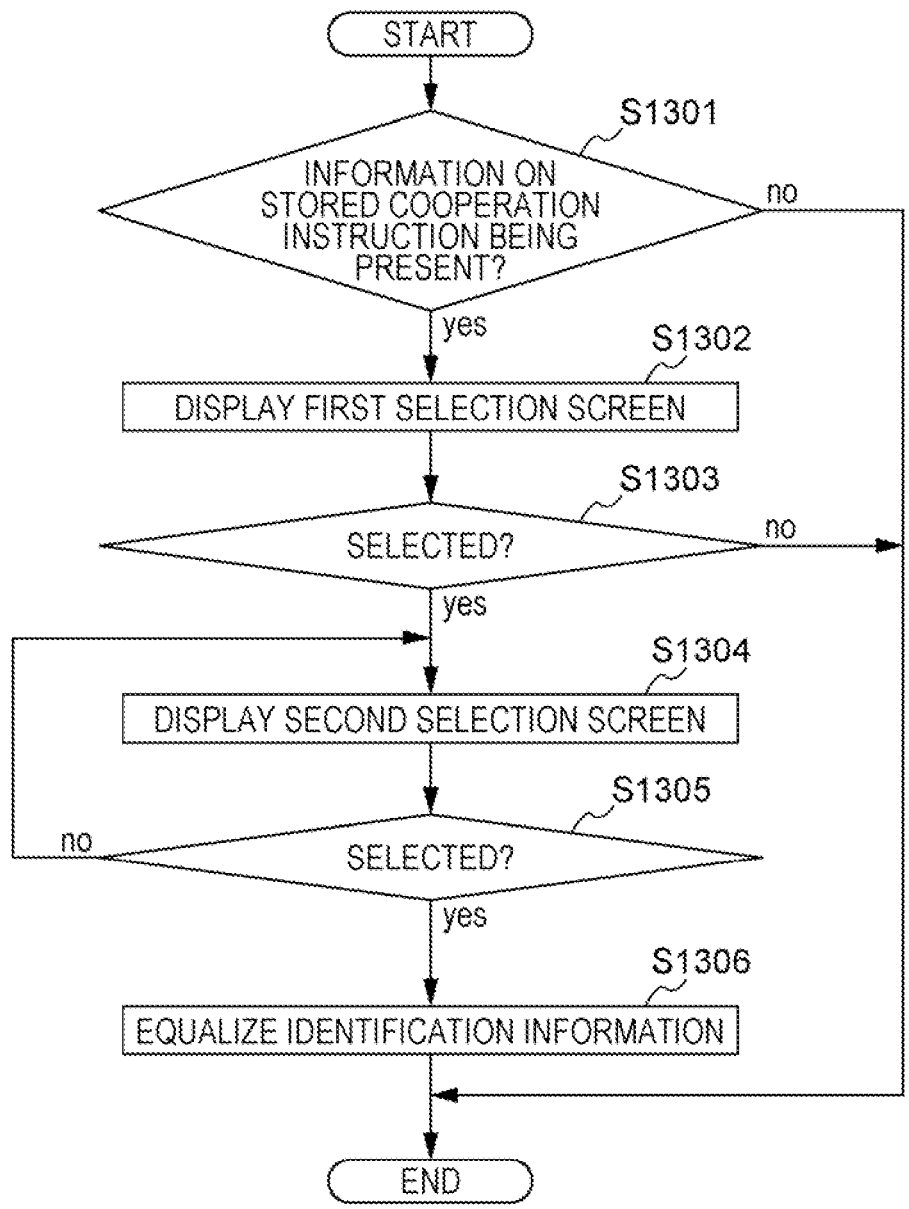
FIG. 13 is a flowchart illustrating an example of a combination determination process of the first basic controller.

FIG. 13 is the flowchart illustrating an example of the combination determination process of the first basic controller 110. The first basic controller 110 iterates this process every predetermined period of time (for example 1 millisecond).

The first basic controller 110 determines whether information on the cooperation instruction is stored on a memory region of the RAM 113, storage 114, or the like (S1301). If the information on the cooperation instruction is not stored (no path in S1301), the first basic controller 110 ends the process. On the other hand, if the information on the cooperation instruction is stored (yes path in S1301) the first basic controller 110 causes the UI 70 to display the first selection screen 71 (S1302). The first, basic controller 110 then determines which of the corresponding images displayed on the first selection screen 71 has been selected (S1303). If no corresponding image has been selected (no path in S1303), the first basic controller 110 ends the process.

If a corresponding image has been selected (yes path in S1303), the first basic controller 110 causes the UI 70 to display the second selection screen 72 (S1304). The first basic controller 110 causes the second selection screen 72 to display a corresponding image responsive to an image (the second image I2 if the corresponding image responsive to the first image I1 is selected or the first image I1 if the corresponding image responsive to the second image I2 is selected) that may be superimposed on an image (the first image I1 or second image I2) responsive to the corresponding image selected in S1303. The first basic controller 110 determines whether which of the corresponding images displayed on the second selection screen 72 has been selected (S1305). If no corresponding image has been selected (no path in S1305), the first basic controller 110 performs operations in S1304 and subsequent steps.

If a corresponding image has been selected (yes path in S1305), the first basic controller 110 equalizes the identification information on the cooperation instruction responsive to the corresponding image selected in S1303 and the identification information on the cooperation instruction responsive to the corresponding image selected in S1305 (S1306).

A process performed by the second basic controller 210 is described with reference to a flowchart.

Figure 14:
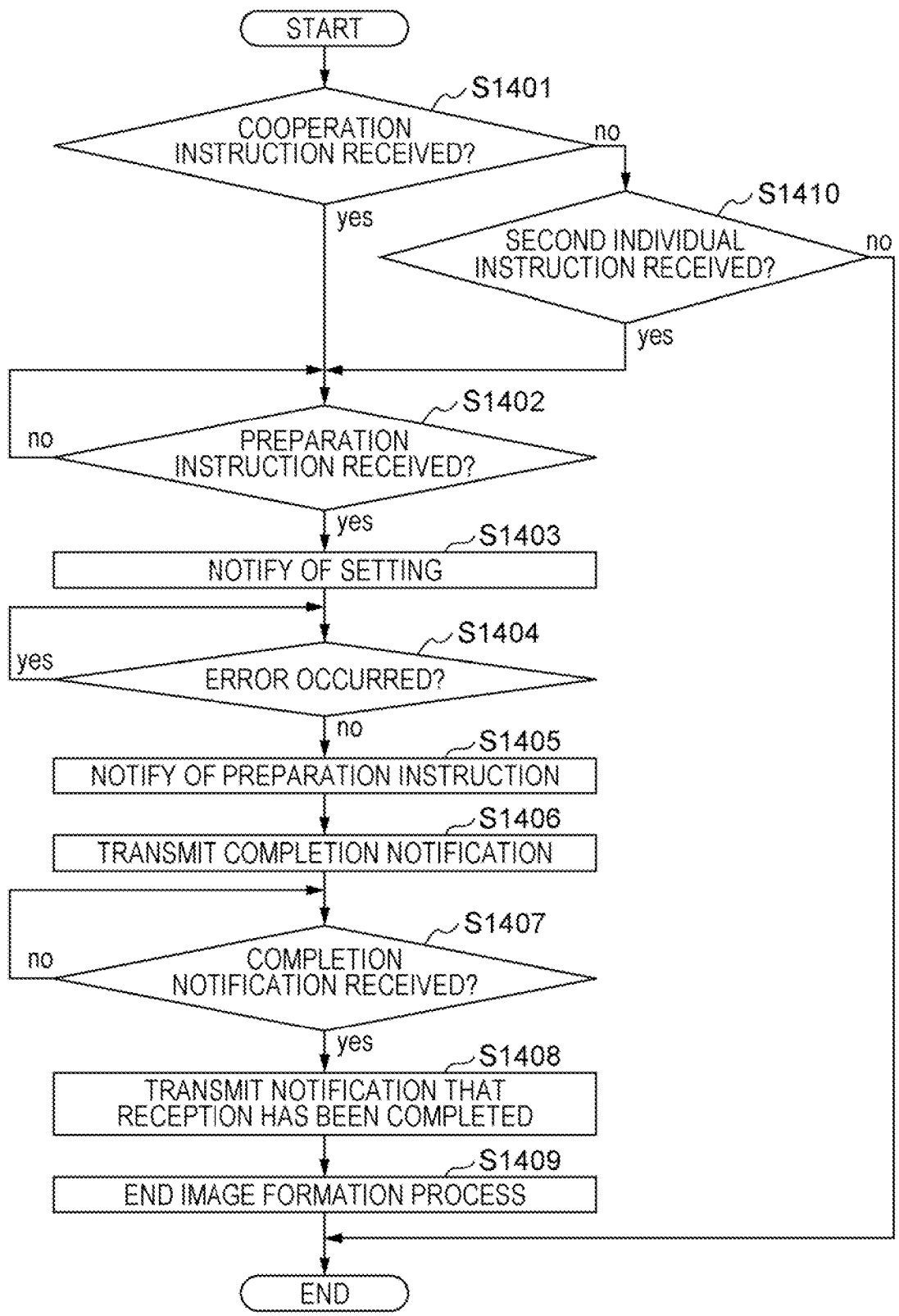
FIG. 14 is a flowchart illustrating an example of a process of a second basic controller.

FIG. 14 is the flowchart illustrating an example of the process of the second basic controller 210. The second basic controller 210 iterates this process every predetermined period of time (for example, 1 millisecond).

The second basic controller 210 determines whether a cooperation instruction has been received from the first basic controller 110 (S1401). If a cooperation instruction has been received (yes path in S1401 (corresponding to the operation in S603 described with reference to FIG. 6A)), the second basic controller 210 determines whether a preparation instruction has been received from the first basic controller 110 (S1402). If a preparation instruction has not been received (no path in S1402), the second basic controller 210 waits on standby until a preparation instruction is received. On the other hand, if a preparation instruction has been received (yes path in S1402 (corresponding to the operation in S608 described with reference to FIG. 6A)), the second basic controller 210 notifies the second subordinate controller 220 of the instructed setting of the image formation (S1403). The operation in step S1403 corresponds to the operation in S609 in FIG. 6A.

The second basic controller 210 determines whether an error has occurred on, the second image former 20 (S1404). The operation in S1404 corresponds to the operation in S611 in FIG. 6A. If an error has occurred (yes path in S1404), the second basic controller 210 waits on standby until the error is resolved. If no error has occurred (no path in S1404), the second basic controller 210 notifies the second subordinate controller 220 of a preparation instruction indicating the image formation preparation of the second image former 20 is to be performed (S1405). The operation in step S1405 corresponds to the operation in S612 in FIG. 6A. The second basic controller 210 then transmits a completion notification to the first basic controller 110 (S1406). The operation in S1406 corresponds to the operation in S615 in FIG. 6B.

The second basic controller 210 determines whether the completion notification indicating that the image formation is complete has been received from the first basic controller 110 (S1407). If the completion notification has not been received (no path in S1407), the second basic controller 210 waits on standby until the completion notification is received. On the other hand, if the completion notification has been received (yes path in S1407 (corresponding to the operation in S627 in FIG. 6B)), the second basic controller 210 transmits to the first basic controller 110 a notification that the completion notification has been received (S1408). The operation in S1408 corresponds to the operation in S628 in FIG. 6B. The second basic controller 210 ends the image formation process (S1409).

If a cooperation instruction has not received in the operation in S1401 (no path in S1401), the second basic controller 210 determines whether a second individual instruction has been received from the first basic controller 110 (S1410). If a second individual instruction has not been received (no path in S1410), the second basic controller 210 ends the process. On the other hand, if a second individual instruction has been received (yes path in S1410 (corresponding to the operation in S803 described with reference to FIG. 8A)), the second basic controller 210 performs operations in S1402 and subsequent steps.

In the exemplary embodiment described above, the process of the first controller 100 is performed by the CPU 111 in the first basic controller 110 and CPU 121 in the first subordinate controller 120 that work cooperatively. The disclosure is not limited to this configuration. For example, the process of the first controller 100 may be performed by a single processor or by three or more processors. According to the exemplary embodiment, likewise, the process of the second controller 200 is performed by the CPU 211 in the second basic controller 210 and the CPU 221 in the second subordinate controller 220 that work cooperatively. The disclosure is not limited to this configuration. For example, the process of the second controller 200 may be performed by a single processor or by three or more processors. The term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

The image forming apparatus 2 includes the CPU 111 and CPU 121 as examples of first processors that control the first image former 10 that forms the first image I1 using toner as an example of the color material having the first color composition. The image forming apparatus 2 also includes the CPU 211 and CPU 221 as examples of second processors that control the second image former 20 that forms, using toner having the second color composition, the second image I2 to be superimposed to the first image I1. The image forming apparatus 2 also includes the UI 70 as an example of a display displaying information.

If an image formation instruction including information indicating that the first image I1 and the second image I2 are to be superimposed is received with another image formation instruction having the same identification information being received, the first processor causes the first image former 10 to form the first image I1 in accordance with a first image formation instruction, responsive to the first color composition, out of the image formation instruction and the other image formation instruction. The first processor transmits to the second processor a second image formation instruction, responsive to the second color composition, out of the image formation instruction and the other image formation instruction (S1106). The second processor causes the second image former 20 to form the second image I2 in accordance with the second image formation instruction.

If the image formation instruction including the information indicating that the first image I1 and the second image I2 are to be superimposed is received with the other image formation instruction having the same identification information not being received (no path in S1103), the first processor causes the UI 70 to display a corresponding image as an example of information related to the image formation instruction in order to prompt the selection of the first image I1 and second image I2 that are to be superimposed (S1302).

If two corresponding images are selected from multiple corresponding images displayed on the UI 70 (yes path in S1303 and S1305), the first processor equalizes the identification information for two image formation instructions responsive to the two corresponding images, causes the first image former 10 to form the first image I1 in accordance with an image formation instruction, responsive to the first color composition, out of the two image formation instructions, and transmits to the second processor an image formation instruction responsive to the second color composition (S1106).

The second selection screen 72 serves as an example of a selection screen for a corresponding image responsive to an image that is to be superimposed to an image responsive to one corresponding image. If the one corresponding image is selected from the corresponding images displayed on the first selection screen 71, the first processor does not cause the second selection screen 72 to display a corresponding image having the same color composition as the color composition of the one corresponding image selected on the first selection screen 71, but causes the second selection screen 72 to display a corresponding image having a color composition different from the color composition of the one corresponding image (see FIG. 10).

The image forming apparatus 2 thus constructed may more likely superimpose two images that are to be superimposed even if the image formation instruction demanding the two images to be superimposed to each other on a single paper sheet S does not include information about the two images.

First Modification of Display on UI 70

Figure 15A:
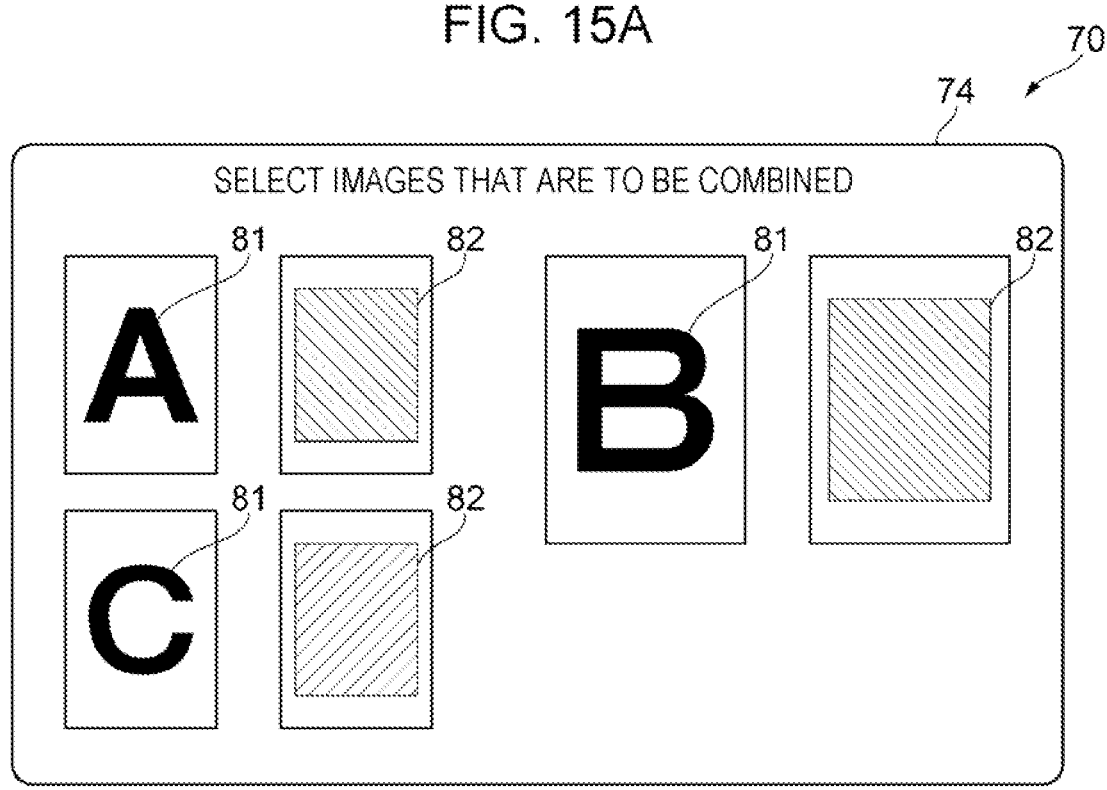
FIG. 15A illustrates an example of a first selection screen of a first modification and FIG. 15B illustrates an example of a second selection screen of the first modification.
Figure 15B:
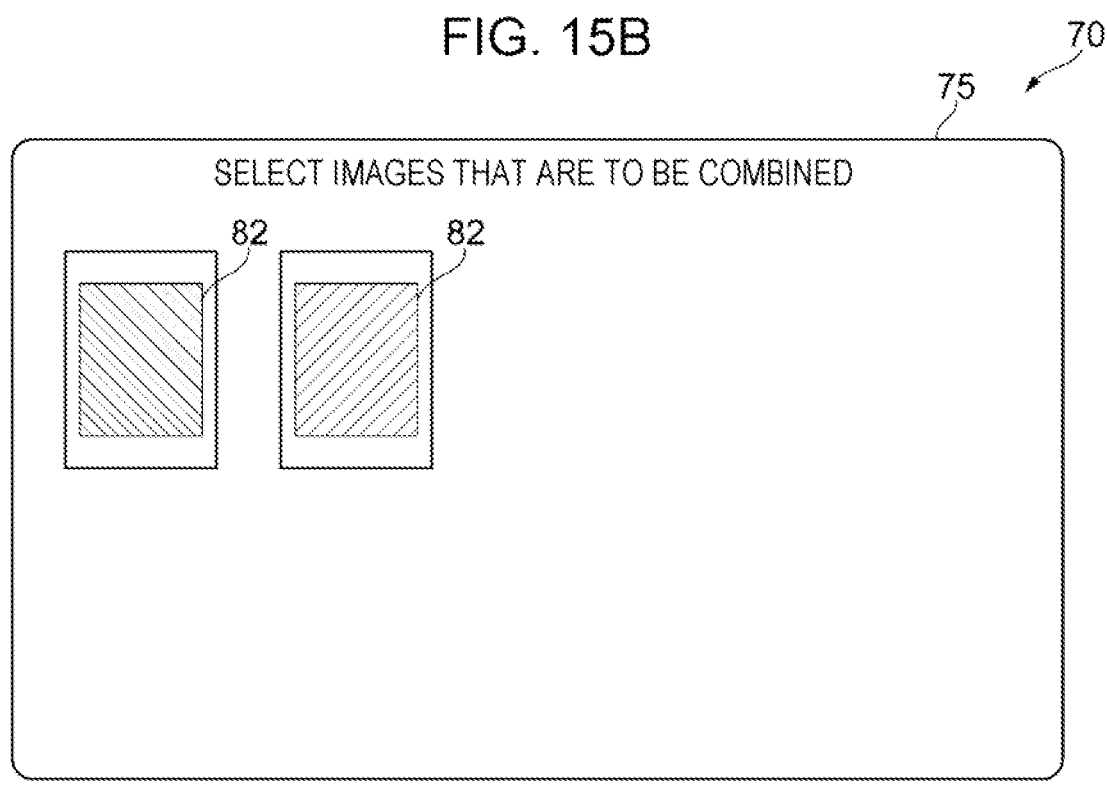

FIG. 15A illustrates an example of a first selection screen 74 of a first modification. FIG. 15B illustrates an example of a second selection screen 75 of the first modification.

If the corresponding image responsive to the first image I1 formed on the first image former 10 and the corresponding image responsive to the second image I2 formed on the second image former 20 is displayed on the UI 70, the first basic controller 110 displays the corresponding images in a size that corresponds to the size of the paper sheet S on which the first image I1 and second image I2 are formed. For example, if the size of the paper sheet S on which the letters A and C as the first image I1 are formed is a sheet size of A4 and the size of the paper sheet S on which the letter B as the second image I2 is formed is a sheet size of A3, the first corresponding image 81 responsive to the letter B is set to be larger than the first corresponding image 81 responsive to the letters A and C.

If one corresponding image is selected from multiple corresponding images displayed on the first selection screen 74 on the UI 70 of the first modification, the first basic controller 110 causes the corresponding images to be displayed in view of the color composition and the size of the paper sheet S on the second selection screen 75 for corresponding images responsive to an image that is to be superimposed to an image responsive to the one corresponding image. Specifically, the first basic controller 110 does not cause the second selection screen 75 to display a corresponding image having the same color composition as the color composition of the one corresponding image selected on the first selection screen 74 and a corresponding image having a size different from the size of the paper sheet S on which the image (the first image I1 or second image I2) responsive to the one corresponding image is formed. The first basic controller 110 causes the second selection screen 75 to display a corresponding image that has a color composition different from the color composition of the one corresponding image selected on the first selection screen 74 and has the same size as the size of the paper sheet S on which the image responsive to the one corresponding image is formed.

As illustrated in FIG. 15A, the first basic controller 110 causes the first selection screen 74 of the first modification on the UI 70 to display both the first corresponding image 81 responsive to the first image I1 and the second corresponding image 82 responsive to the second image I2 in a size that corresponds to the size of the paper sheet S on which the first image I1 and second image I2 are formed. If one of displayed corresponding images is selected, the first basic controller 110 determines whether the one corresponding image is the first corresponding image 81 responsive to the first image I1 or the second corresponding image 82 responsive to the second image I2. Upon determining that the one corresponding image is the first corresponding image 81 responsive to the first image I1, the first basic controller 110 does not cause the second selection screen 75 of the first modification on the UI 70 to display the first corresponding image 81 responsive to the first image I1 as illustrated in FIG. 15B. The first basic controller 110 causes the second selection screen 75 of the first modification to display the second corresponding image 82 that corresponds to the second image I2 and is formed on a paper sheet S having the same size as the paper sheet S on which the first image I1 is formed. In this way, the arrangement described above may thus control the possibility that the user makes an erroneous selection.

As described above, according to the first modification, if one corresponding image is selected from multiple corresponding images, the first processor does not cause a corresponding image different in size from the paper sheet S responsive to the one corresponding image to be displayed but causes a corresponding image identical in size to the paper sheet S responsive to the one corresponding image to be displayed. This may control the possibility that the user makes an erroneous selection.

Second Modification of Display on UI 70

Figure 16:
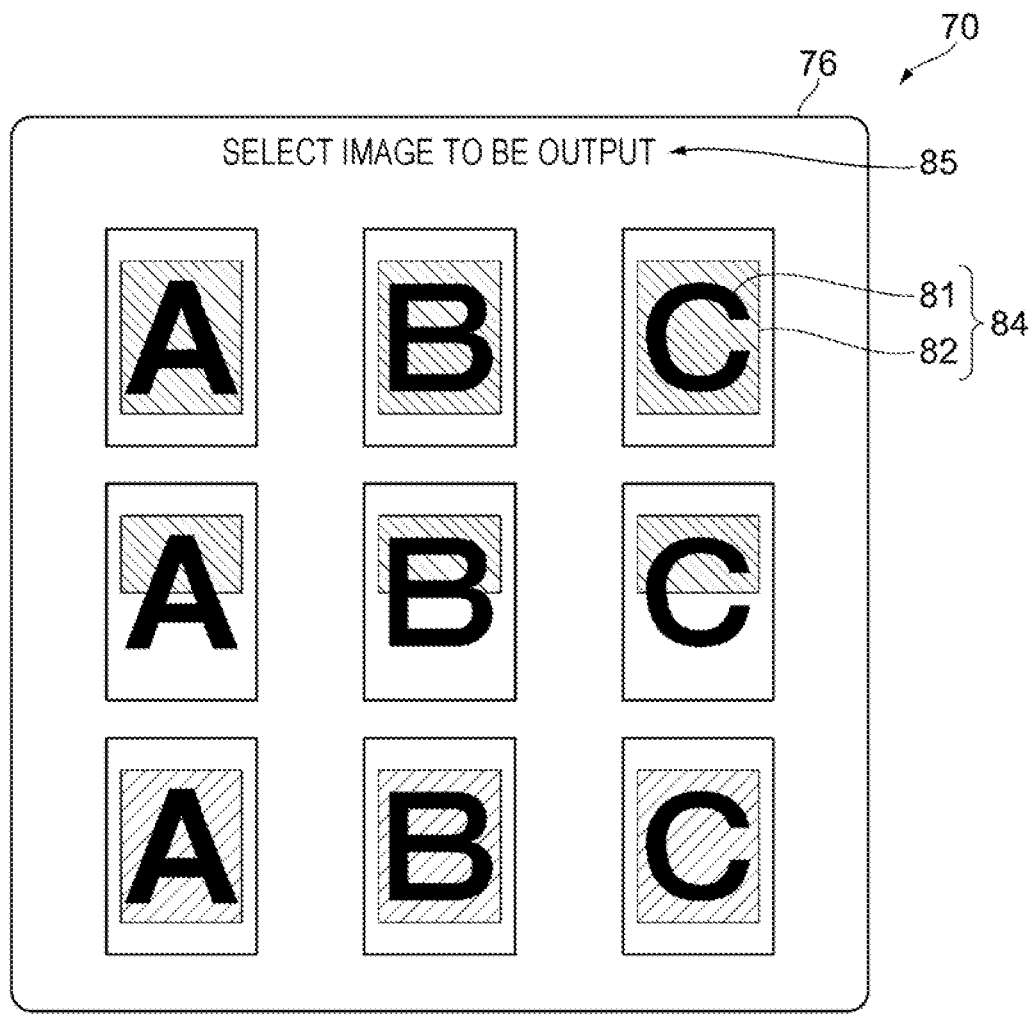
FIG. 16 illustrates an example of a selection screen of a second modification.

FIG. 16 illustrates an example of a selection screen 76 of a second modification.

The first basic controller 110 may cause the UI 70 to display a combination image 64 where the first corresponding image 81 responsive to the first image I1 formed on the first image former 10 is superimposed to the second corresponding image 82 responsive to the second image I2 formed on the second image former 20.

If there are multiple first corresponding screens 81 and multiple second corresponding screens 82, the first basic controller 110 causes the UI 70 to display combination screens 84 for all combinations of the first corresponding screens 81 and second corresponding screens 82. For example, if there are three first corresponding screens 81 and three second corresponding screens 82, the first basic controller 110 causes the UI 70 to display nine combination images 84 as illustrated in FIG. 16.

If one of the displayed combination images 84 is selected, it is decided that the cooperation instruction responsive to the first corresponding image 81 and the cooperation instruction responsive to the second corresponding image 82, forming the selected combination image 84, are equalized in identification information.

In order to prompt the user to select two images that art to be superimposed, the first basic controller 110 may cause the selection screen 76 of the second modification to display a message 85 reading "Select an image to be output."

According to the second modification, the first processor causes the UI 70 to display the combination image 84. The combination image 84 is obtained by superimposing a corresponding image (for example, the first corresponding image 81), responsive to an image (for example, the first image I1) formed in accordance with an image formation instruction, onto another corresponding image (for example, the second corresponding image 82) responsive to another image (for example, the second image I2) having a color composition (for example, the second color composition) different from a color composition (for example, the first color composition) of the image. The two images are superimposed into the combination image 84, like the image formed on the paper sheet S. This arrangement may control the possibility that the user makes an erroneous selection.

Third Modification of Display on UI 70

Figure 17:
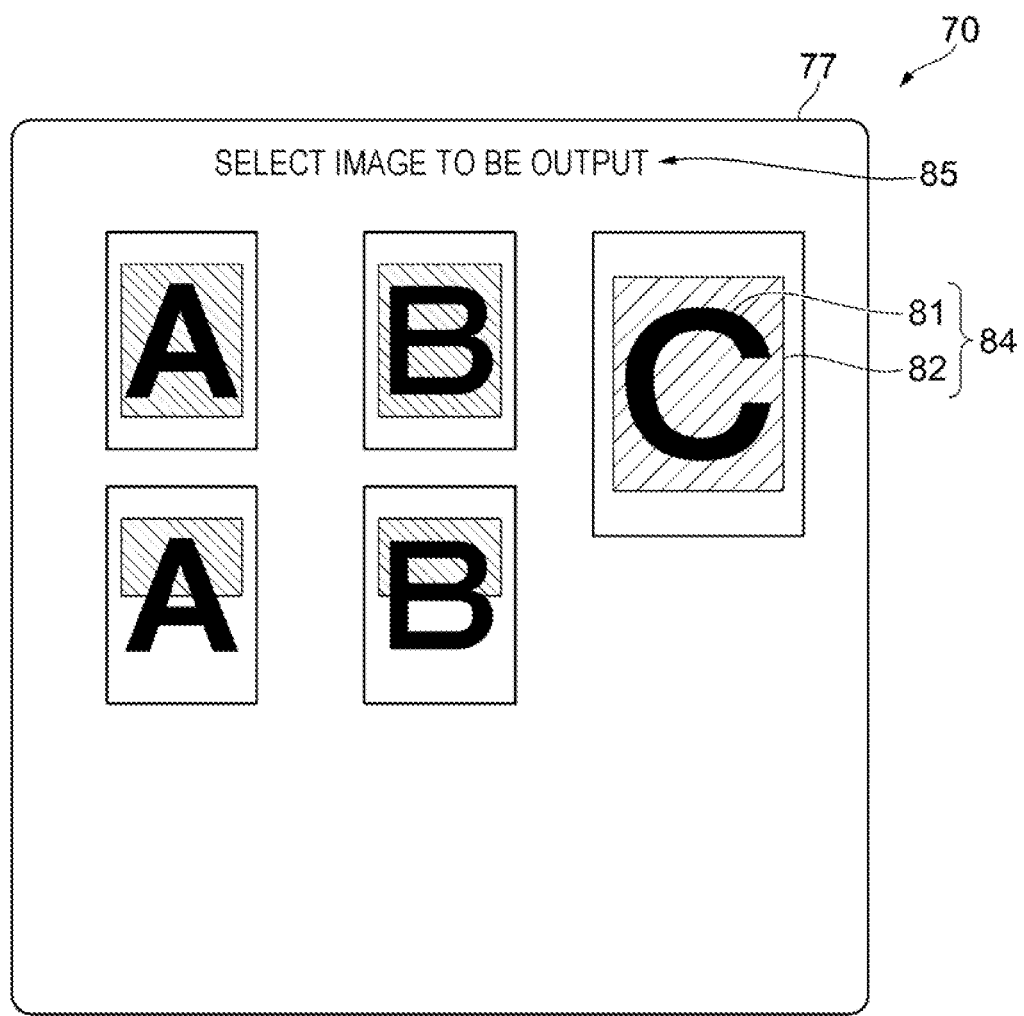
FIG. 17 illustrates an example of a selection screen of a third modification.

FIG. 17 illustrates an example of a selection screen 77 of a third modification.

When the combination image 84 is displayed as in the second modification, the first basic controller 110 may superimpose the first corresponding image 81 and second corresponding image 82 that are equal in size to the paper sheet S. For example, if there are two first corresponding screens 81 having a sheet size of A4, one first corresponding image 81 having a sheet size of A3, two second corresponding screens 82 having a sheet size of A4, and one second corresponding image 82 having a sheet size of A3, the first basic controller 110 may cause the UI 70 to display a total of five combination images 84 including four A4 combination images 84 and one A3 combination image 84 as illustrated in FIG. 17.

According to the third modification, if the size of the paper sheet S having an image (for example, the first image I1) is equal to the size of the paper sheet S having another image (for example, the second image I2), the first processor superimposes a corresponding image (for example, the first corresponding image 81) onto another corresponding image (for example, the second corresponding image 82). This arrangement may reduce the user's choices and thus control the possibility that the user makes an erroneous selection.

When the combination image 84 is displayed as in the second modification, information on the terminal apparatus 9 included in the identification information of the cooperation instruction of one image (for example, the first image I1) may be identical to information on the terminal apparatus 9 included in the identification information of the cooperation instruction of another image (for example, the second image I2). In such a case, the first basic controller 110 may superimpose one corresponding image (for example, the first corresponding image 81) onto another corresponding image (for example, the second corresponding screen 82). This arrangement may reduce the user's choices and thus control the possibility that the user makes an erroneous selection.

Information on the user having output the image formation instruction may be included in the identification information on the cooperation instruction. When the combination image 84 is displayed as in the second modification, information on the user included in the identification information on the cooperation instruction of an image may be identical to information on the user included in the identification information on the cooperation instruction of another image. In such a case, the first basic controller 110 may superimpose one corresponding image onto another corresponding image. The user having output the cooperation instruction of the image responsive to the corresponding image is the same user having output the cooperation instruction of the other image responsive to the other corresponding image and the combination image 84 in which the corresponding image and the ether corresponding image are superimposed is displayed on the UI 70. This arrangement may control the possibility that the user makes an erroneous selection.

Fourth Modification of Display on UI 70

Figure 18A:
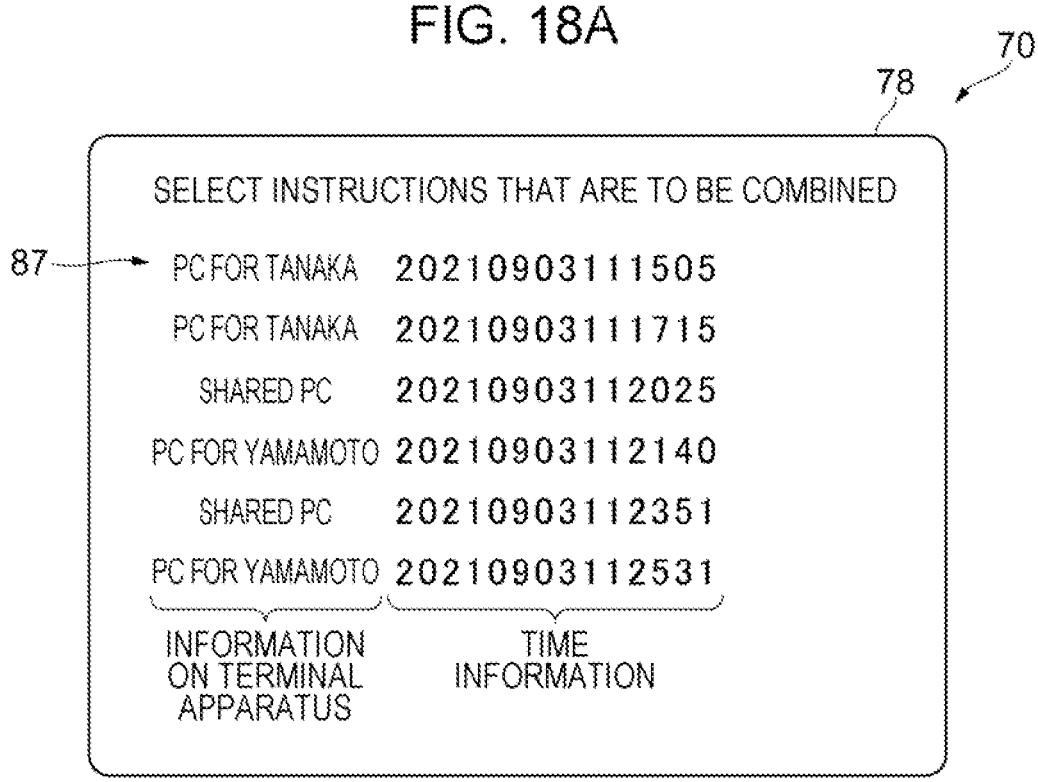
FIG. 18A illustrates an example of a first selection screen of a fourth embodiment and FIG. 18B illustrates an example of a second selection screen of the fourth modification.
Figure 18B:
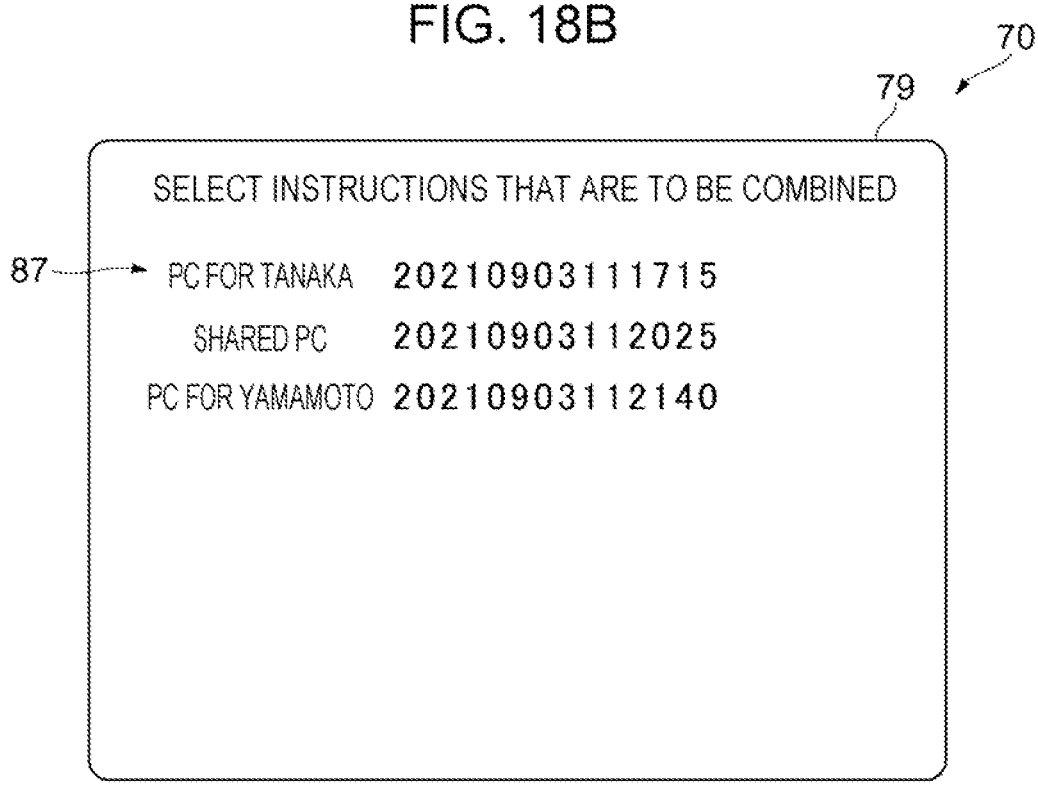

FIG. 18A illustrates an example of a first selection screen 78 of a fourth modification. FIG. 18B illustrates a second selection screen 79 of the fourth modification.

The first basic controller 110 may display, in the form of characters 87, information included in the identification information on the cooperation instruction, as information related to the cooperation instruction stored on the storage 114. For example, referring to FIG. 18A, the first basic controller 110 may display, in the form of the characters 87, information on the terminal apparatus 9 having output the cooperation instruction and time (for example, time and date) when the cooperation instruction is output.

If one of the characters 87 displayed on the first selection screen 78 of the UI 70 is selected, the first basic controller 110 may cause the UI 70 to display the second selection screen 79 that is used to select a character 87 responsive to an image that is superimposed to an image responsive to the one character 87. Referring to FIG. 18B, the first basic controller 110 does not cause the second selection screen 79 to display a character 37 responsive to the cooperation instruction having the same color composition as the color composition of the cooperation instruction responsive to a character 87 selected on the first selection screen 78. The first basic controller 110 causes the second selection screen 79 to display a character 87 responsive to the cooperation instruction having a different color composition.

The first basic controller 110 does not cause the second selection, screen 79 to display a character 87 of the cooperation instruction having a paper sheet S different in size from the paper sheet for the cooperation instruction responsive to a character 87 selected on the first selection screen 78 but may cause the second selection screen 79 to display a character 87 responsive to the cooperation instruction having the same size of the paper sheet S.

The first basic controller 110 does not cause the second selection screen 79 to display a character 87 responsive to the cooperation instruction having the same color composition as the color composition of the cooperation instruction responsive to a character 87 selected on the first selection screen 78 or a character 87 responsive to the cooperation instruction having a paper sheet S different in size from the paper sheet S of the cooperation instruction responsive to a character 87 selected on the first selection screen 76. The first basic controller 110 may cause the second selection screen 79 to display a character 87 responsive to the cooperation instruction having a different color composition and the same size of the paper sheet S.

According to the fourth modification, two images that are to be superimposed may be more likely superimposed even if the image formation instruction demanding the two images to be superimposed on the paper sheet S does not include information about the two images.

Each program to be executed by the CPU 111 in the first basic controller 110, CPU 121 in the first subordinate controller 120, CPU 211 in the second basic controller 210, and CPU 221 in the second subordinate controller 220 may be delivered in a recorded state on one of computer readable recording media. The computer readable recording media include a magnetic recording medium (magnetic tape or magnetic disk), optical recording medium (optical disk), magneto-optical recording medium, and semiconductor recording memory. The program may be downloaded via a communication medium, such as the Internet.

The program causes the first processor and second processor to perform functions described below. The first processor is configured to control the first image former 10 that forms the first image I1 using the color material of the first color composition. If an image formation instruction including information indicating that the first image I1 is to be superimposed onto the second image I2 that the second image former 20 forms using the color material of the second color composition is received, with another image formation instruction having the same identification information being received, the first processor: causes the first image former 10 to form the first image I1 in accordance with a first image formation instruction, responsive to the first color composition, out of the image formation instruction and the other image formation instruction; and transmits a second image formation instruction responsive to the second color composition to the second processor that is configured to control the second image former 20.

The program of the exemplary embodiment of the disclosure causes the second processor to perform a function to cause the second image former 20 to form the second image I2 in accordance with the second image formation instruction.

An image formation instruction including information demanding the first image I1 and the second image I2 to be superimposed to each other may be received but another image formation instruction having the same identification information may not be received. In such a case, the program of the exemplary embodiment of the disclosure causes the first processor to perform a function to cause the UI 70 to display information related to the image formation instruction in order to prompt selection of the first image I1 and the second image I2 that are to be superimposed.

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:
   a first processor configured to control a first image former that forms a first image using a color material having a first color composition;
   a second processor configured to control a second image former that forms, using a color material having a second color composition, a second image to be superimposed on the first image; and
   a display displaying information,
   wherein the first processor is configured to:
      if an image formation instruction, including information indicating that the first image and the second image are to be superimposed to each other is received, with a different image formation instruction being received, the different image formation instruction having identification information identical to identification information for the image formation instruction,
      cause the first image former to form the first image in accordance with a first image formation instruction, corresponding to the first color composition, out of the image formation instruction and the different image formation instruction; and
      transmit to the second processor a second image formation instruction corresponding to the second color composition, and
   wherein the second processor is configured to cause the second image former to form the second image in accordance with the second image formation instruction, and
   wherein the first processor is configured to, if the image formation instruction, including the information indicating that the first image and the second image are to be superimposed to each other, is received, with the different image formation instruction having the identical identification information not being received, cause the display to display information related to the image formation instruction in order to prompt selection between the first image and the second image.

2. The image forming apparatus according to claim 1, wherein the first processor is configured to, if two pieces of the related information are selected from a plurality of pieces of the related information displayed on the display, equalize identification information on two image formation instructions responsive to the two pieces of the related information, cause the first image former to form the first image in accordance with an image formation instruction, responsive to the first color composition, out of the two image formation instructions having the equalized identification information, and transmit to the second processor an image formation instruction responsive to the second color composition.

3. The image forming apparatus according to claim 1, wherein the first processor is configured to cause the display to display as the related information a corresponding image responsive to an image that is formed in accordance with the image formation instruction.

4. The image forming apparatus according to claim 2, wherein the first processor is configured to cause the display to display as the related information a corresponding image responsive to an image that is formed in accordance with the image formation instruction.

5. The image forming apparatus according to claim 3, wherein the first processor is configured to, if one corresponding image is selected from a plurality of the corresponding images, not cause the display to display, on a selection screen of a corresponding image responsive to an image that is to be superimposed on an image responsive to the one corresponding image, a corresponding image having a color composition identical to a color composition of the one corresponding image, but cause the display to display on the selection screen a corresponding image having a color composition different from the color composition of the one corresponding image.

6. The image forming apparatus according to claim 4, wherein the first processor is configured to, if one corresponding image is selected from a plurality of corresponding images, not cause the display to display, on a selection screen of a corresponding image responsive to an image that is to be superimposed on an image responsive to the one corresponding image, a corresponding image having a color composition identical to a color composition of the one corresponding image, but cause the display to display on the selection screen a corresponding image having a color composition different from the color composition of the one corresponding image.

7. The image forming apparatus according to claim 3, wherein the first processor is configured to, if one corresponding image is selected from a plurality of the corresponding images, not cause the display to display a corresponding image having a size different from a size of a paper sheet of the one corresponding image but cause the display to display a corresponding image having a size identical to the size of the paper sheet of the one corresponding image.

8. The image forming apparatus according to claim 4, wherein the first processor is configured to, if one corresponding image is selected from a plurality of the corresponding images, not cause the display to display a corresponding image having a size different from a size of paper sheet of the one corresponding image but cause the display to display a corresponding image having a size identical to the size of the paper sheet of the one corresponding image.

9. The image forming apparatus according to claim 5, wherein the first processor is configured to, if one corresponding image is selected from a plurality of the corresponding images, not cause the display to display a corresponding image having a size different from a size of paper sheet of the one corresponding image but cause the display to display a corresponding image having a size identical to the size of the paper sheet of the one corresponding image.

10. The image forming apparatus according to claim 6, wherein the first processor is configured to, if one corresponding image is selected from a plurality of the corresponding images, not cause the display to display a corresponding image having a size different from a size of paper sheet of the one corresponding image but cause the display to display a corresponding image having a size identical to the size of the paper sheet of the one corresponding image.

11. The image forming apparatus according to claim 1, wherein the first processor is configured to cause the display to display as the related information a combination image that results from superimposing a corresponding image responsive to one image formed in accordance with the image formation instruction, to a second corresponding image responsive to another image having a color composition different from a color composition of the one image.

12. The image forming apparatus according to claim 2, wherein the first processor is configured to cause the display to display as the related information a combination image that results from superimposing a corresponding image responsive to one image formed in accordance with the image formation instruction, to a second corresponding image responsive to another image having a color composition different from a color composition of the one image.

13. The image forming apparatus according to claim 11, wherein the first processor is configured to, if a size of a paper sheet for the one image is identical to a size of a paper sheet for the other image, superimpose the corresponding image onto the second corresponding image.

14. The image forming apparatus according to claim 12, wherein the first processor is configured to, if a size of a paper sheet for the one image is identical to a size of a paper sheet for the other image, superimpose the corresponding image onto the second corresponding image.

15. The image forming apparatus according to claim 11, wherein the first processor is configured to, if information on a user having output the image formation instruction is identical to information on a user having output an image formation instruction of the other image, superimpose the corresponding image onto the second corresponding image.

16. The image forming apparatus according to claim 12, wherein the first processor is configured to, if information on a user having output the image formation instruction is identical to information on a user having output an image formation instruction of the other image, superimpose the corresponding image onto the second corresponding image.

17. A non-transitory computer readable medium storing a program causing a computer to execute a process, the process comprising:
   controlling a first image former that forms a first image using a color material having a first color composition;
   controlling a second image former that forms, using a color material having a second color composition, a second image to be superimposed on the first image; and
   if an image formation instruction, including information indicating that the first image and the second image are to be superimposed to each other is received, with a different image formation instruction being received, the different image formation instruction having identification information identical to identification information for the image formation instruction,
   causing the first image former to form the first image in accordance with a first image formation instruction, corresponding to the first color composition, out of the image formation instruction and the different image formation instruction;
   transmitting to the second processor a second image formation instruction corresponding to the second color composition;
   causing the second image former to form the second image in accordance with the second image formation instruction; and
   if the image formation instruction, including the information indicating that the first image and the second image are to be superimposed to each other, is received, with the different image formation instruction having the identification information not being received,
   causing the display to display information related to the image formation instruction in order to prompt selection between the first image and the second image.

18. An image forming method comprising:
   controlling a first image former that forms a first image using a color material having a first color composition;
   controlling a second image former that forms, using a color material having a second color composition, a second image to be superimposed on the first image;
   if an image formation instruction, including information indicating that the first image and the second image are to be superimposed to each other is received, with a different image formation instruction being received, the different image formation instruction having identification information identical to identification information for the image formation instruction, causing the first image former to form the first image in accordance with a first image formation instruction, corresponding to the first color composition, out of the image formation instruction and the different image formation instruction;

transmitting to the second processor a second image formation instruction corresponding to the second color composition;

causing the second image former to form the second image in accordance with the second image formation instruction; and if the image formation instruction, including the information indicating that the first image and the second image are to be superimposed to each other, is received, with the different image formation instruction having the identical identification information not being received, causing the display to display information related to the image formation instruction in order to prompt selection between the first image and the second image.

* * * * *